US012269408B2

United States Patent
Ohno et al.

(10) Patent No.: US 12,269,408 B2
(45) Date of Patent: *Apr. 8, 2025

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,646

(22) Filed: Sep. 13, 2023

(65) Prior Publication Data

US 2024/0123934 A1 Apr. 18, 2024

(30) Foreign Application Priority Data

Oct. 14, 2022 (JP) ................. 2022-165757

(51) Int. Cl.
*B60R 21/207* (2006.01)
*B60R 21/00* (2006.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ................ B60R 21/207; B60R 21/233; B60R 2021/2078; B60R 2021/23308; B60R 2021/23386; B60R 2021/23388
See application file for complete search history.

(56) References Cited

U.S. PATENT DOCUMENTS 5,926,928 A * 7/1999 Lundstedt ............ A44B 11/266
24/615
6,000,715 A 12/1999 Tschaeschke
(Continued)

FOREIGN PATENT DOCUMENTS

CN 109421648 A * 3/2019 ............... B60N 2/14
CN 109421655 A * 3/2019 ......... A44B 11/2561
(Continued)

OTHER PUBLICATIONS

Office Action issued to U.S. Appl. No. 18/367,665 dated Jun. 6, 2024 (9 Pages).

*Primary Examiner* — Paul N Dickson
*Assistant Examiner* — Tiffany L Webb
(74) *Attorney, Agent, or Firm* — Dinsmore & Shohl LLP

(57) ABSTRACT

An airbag device includes an airbag that is supplied with gas generated by an inflator during a vehicle collision and that inflates and deploys from a rear side of a vehicle seat toward a front side via an upper side. In an inflated and deployed state, the airbag includes a pair of front-rear chambers extending in a seat front-rear direction via left and right sides of a head of a passenger, an airbag body that is in communication with the pair of front-rear chambers and that is disposed at a front side of the passenger between the pair of front-rear chambers, and a pair of rear tethers including one-end portions attached to the airbag body and other-end portions attached to a seatback of the vehicle seat. At least a rear tether on a side door side is configured so as to be releasable after a collision of the vehicle.

13 Claims, 20 Drawing Sheets

(51) Int. Cl.
*B60R 21/233* (2006.01)
*B60R 21/2338* (2011.01)
*B60R 21/013* (2006.01)

(52) U.S. Cl.
CPC . *B60R 2021/0004* (2013.01); *B60R 2021/006* (2013.01); *B60R 21/013* (2013.01); *B60R 2021/2076* (2013.01); *B60R 2021/2078* (2013.01); *B60R 2021/23308* (2013.01); *B60R 2021/23388* (2013.01)

(56) References Cited

U.S. PATENT DOCUMENTS

| | | | | |
|---|---|---|---|---|
| 10,351,090 | B2* | 7/2019 | Yamada | B60R 21/233 |
| 11,285,903 | B2* | 3/2022 | Kokeguchi | B60R 21/207 |
| 11,285,904 | B2* | 3/2022 | Jung | B60R 21/2338 |
| 11,383,667 | B1* | 7/2022 | Kadam | B60R 21/23138 |
| 11,427,150 | B1* | 8/2022 | Jaradi | B60R 21/207 |
| 11,577,682 | B1* | 2/2023 | Bates | B60R 21/2338 |
| 2006/0119083 | A1* | 6/2006 | Peng | B60R 21/2338 280/730.2 |
| 2007/0205591 | A1* | 9/2007 | Bito | B60R 21/233 280/743.2 |
| 2009/0189376 | A1* | 7/2009 | Vigeant | B60R 21/233 280/743.2 |
| 2015/0166002 | A1* | 6/2015 | Fukawatase | B60R 21/233 280/730.1 |
| 2016/0121839 | A1* | 5/2016 | Ko | B60R 21/233 280/730.1 |
| 2017/0015272 | A1* | 1/2017 | Ohno | B60R 22/46 |
| 2017/0028955 | A1* | 2/2017 | Ohno | B60R 21/233 |
| 2017/0057456 | A1* | 3/2017 | Ohno | B60R 21/231 |
| 2017/0158155 | A1* | 6/2017 | Ohno | B60R 21/237 |
| 2017/0282834 | A1* | 10/2017 | Sugie | B60R 21/231 |
| 2017/0291565 | A1 | 10/2017 | Yamamoto et al. | |
| 2017/0297524 | A1* | 10/2017 | Sugie | B60R 21/233 |
| 2017/0334385 | A1* | 11/2017 | Sakakibara | B60N 2/686 |
| 2017/0334386 | A1* | 11/2017 | Park | B60R 21/2338 |
| 2018/0056922 | A1* | 3/2018 | Yamada | B60R 21/205 |
| 2018/0126942 | A1* | 5/2018 | Ohno | B60R 21/237 |
| 2018/0222432 | A1* | 8/2018 | Schneider | B60R 21/262 |
| 2018/0236962 | A1* | 8/2018 | Ohno | B60R 21/23138 |
| 2019/0016293 | A1 | 1/2019 | Saso | |
| 2019/0031132 | A1* | 1/2019 | Dry | B60R 21/2338 |
| 2019/0054884 | A1* | 2/2019 | Dry | B60R 21/2342 |
| 2019/0111879 | A1* | 4/2019 | Ohmi | B60R 21/231 |
| 2019/0275979 | A1* | 9/2019 | Dry | B60R 21/207 |
| 2019/0291678 | A1* | 9/2019 | Cho | B60R 21/233 |
| 2019/0389420 | A1* | 12/2019 | Dry | B60R 21/231 |
| 2020/0156586 | A1* | 5/2020 | Lin | B60R 21/013 |
| 2020/0290548 | A1* | 9/2020 | Kokeguchi | B60R 21/233 |
| 2021/0061211 | A1* | 3/2021 | Jung | B60R 21/2338 |
| 2021/0316695 | A1 | 10/2021 | Matsushita et al. | |
| 2021/0402949 | A1* | 12/2021 | Sung | B60R 21/2338 |
| 2022/0017036 | A1 | 1/2022 | Jeong et al. | |
| 2022/0111818 | A1* | 4/2022 | Schneider | B60R 21/23138 |
| 2022/0203921 | A1* | 6/2022 | Kawamura | B60R 21/2338 |
| 2022/0340096 | A1* | 10/2022 | Axblom | B60R 21/2338 |
| 2022/0348161 | A1* | 11/2022 | Faruque | B60R 21/233 |
| 2022/0388472 | A1* | 12/2022 | Hwangbo | B60R 21/23138 |
| 2023/0065150 | A1* | 3/2023 | Min | B60R 21/233 |
| 2023/0067856 | A1* | 3/2023 | Min | B60R 21/233 |
| 2023/0294629 | A1* | 9/2023 | Nakajima | B60R 21/233 280/729 |
| 2023/0303028 | A1* | 9/2023 | Ohno | B60R 21/2338 |
| 2023/0339421 | A1* | 10/2023 | Yamamoto | B60R 21/207 |
| 2023/0406258 | A1* | 12/2023 | Line | B60R 21/214 |
| 2024/0083381 | A1* | 3/2024 | Ito | B60R 21/207 |
| 2024/0123932 | A1* | 4/2024 | Ohno | B60R 21/233 |
| 2024/0123933 | A1* | 4/2024 | Ohno | B60R 21/264 |
| 2024/0123935 | A1* | 4/2024 | Ohno | B60R 21/207 |
| 2024/0123936 | A1* | 4/2024 | Ohno | B60R 21/233 |
| 2024/0123937 | A1* | 4/2024 | Ohno | B60R 21/207 |
| 2024/0123940 | A1* | 4/2024 | Ohno | B60R 21/207 |

FOREIGN PATENT DOCUMENTS

| | | | | |
|---|---|---|---|---|
| CN | 114435295 | A | * 5/2022 | |
| CN | 114906090 | A | * 8/2022 | |
| CN | 217435673 | U | * 9/2022 | |
| CN | 117284234 | A | * 12/2023 | |
| DE | 19834061 | A1 | * 2/2000 | B60N 2/4876 |
| DE | 202007008161 | U1 | * 10/2007 | B60R 21/217 |
| DE | 102011084093 | A1 | * 4/2012 | B60R 21/23138 |
| DE | 102017131121 | A1 | * 6/2019 | |
| DE | 102019118843 | A1 | * 1/2021 | B60R 21/207 |
| DE | 102020125611 | A1 | * 4/2021 | B60N 2/143 |
| DE | 102023106465 | A1 | * 12/2023 | B60R 21/207 |
| DE | 102022118796 | A1 | * 2/2024 | |
| GB | 2473608 | A | * 3/2011 | B60R 21/231 |
| JP | H10-067287 | A | 3/1998 | |
| JP | 2017-185978 | A | 10/2017 | |
| JP | 2019-018593 | A | 2/2019 | |
| JP | 2019-218013 | A | 12/2019 | |
| JP | 2019-218014 | A | 12/2019 | |
| WO | WO-2022009622 | A1 | * 1/2022 | B60R 21/207 |
| WO | WO-2022097459 | A1 | * 5/2022 | |
| WO | WO-2022225264 | A1 | * 10/2022 | |
| WO | WO-2023160859 | A1 | * 8/2023 | B60R 21/23138 |
| WO | WO-2024048930 | A1 | * 3/2024 | |

\* cited by examiner

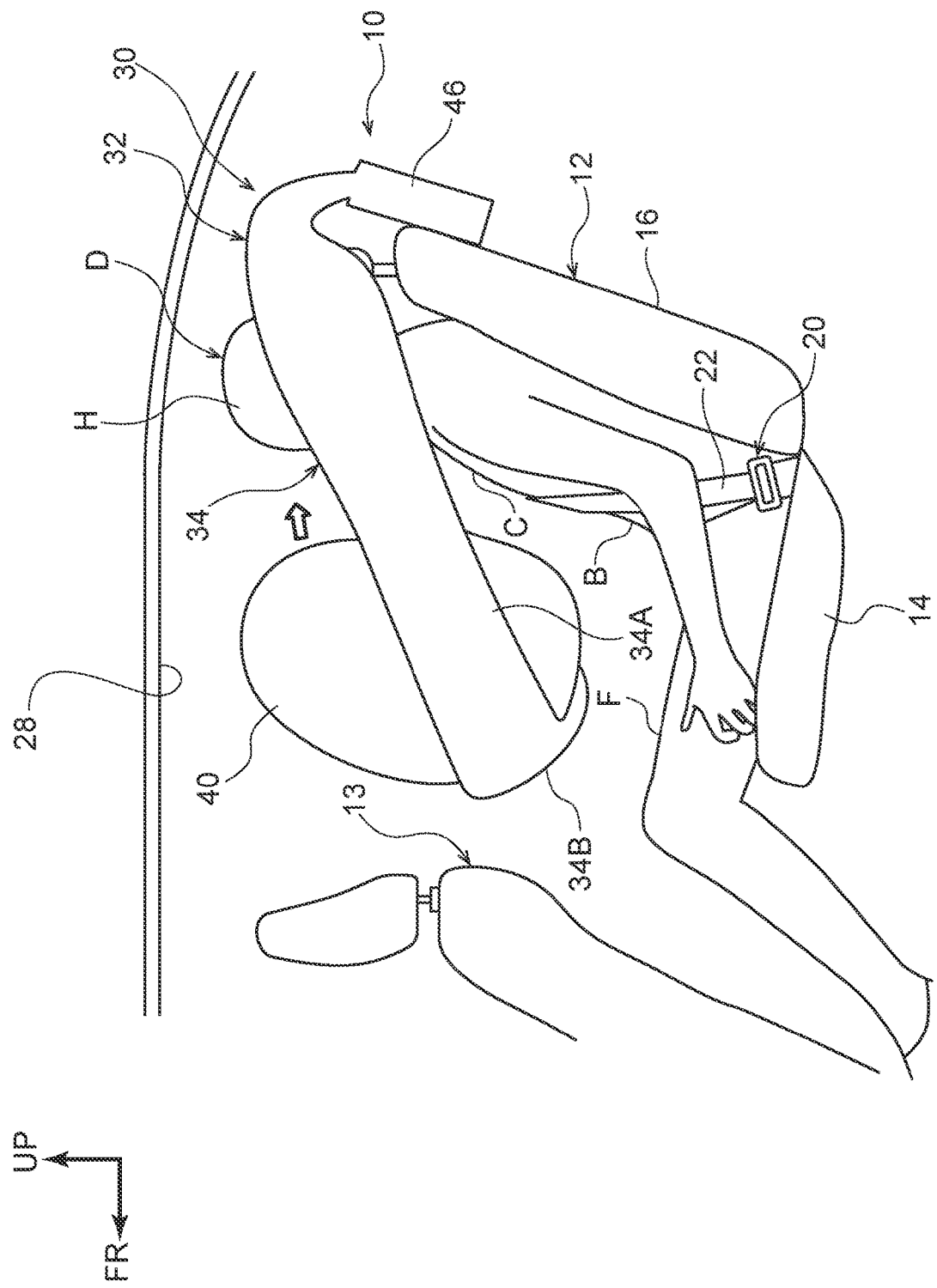

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165757 filed on Oct. 14, 2022, the disclosure of which is incorporated by reference herein.

BACKGROUND

Technical Field

The present disclosure relates to an airbag device and to a passenger protection device including an airbag device.

Related Art

For example, an airbag device disclosed in Japanese Patent Application Laid-Open (JP-A) No. 2019-018593 includes an inflator that generates gas at high pressure during a shock input, and a bag body that inflates and deploys from a seatback of a vehicle seat on receipt of gas supplied from the inflator. The bag body includes a trunk support section that deploys at an opposite side of a trunk of a passenger seated in the vehicle seat to the seatback side of the trunk, and a pair of head support sections that respectively deploy at each seat width direction side of the head of the passenger and that connect to the truck support section. In a deployed state, an escape portion is formed to the bag body so as to pass through in a height direction between the pair of head support sections and avoiding the head of the passenger. Furthermore, there is a coupling member provided in the airbag device to couple between the deployed trunk support section and either the vehicle seat or vehicle body.

For example, an airbag device disclosed in JP-A No. 2019-218014 includes an inflator, and an airbag that is deployed by gas supplied from the inflator. The airbag includes a rear inflation portion that deploys at a back face side of a seat, a pair of side inflation portions that extend toward a front side from both width direction sides of the rear inflation portion, and a pair of front inflation portions that extend from the pair of side inflation portions toward a center therebetween, that are mutually coupled together at the center side, and that cover across in front of the passenger. Moreover, in this airbag device, a coupling member is provided at couple the airbag together with a pair of support points provided at both width direction sides of a seat further to the front side than an airbag housing section.

Thus in the airbag device as described above, the coupling member is provided at couple the airbag body (bag body, airbag) together with a vehicle seat or a vehicle body. Thus when a passenger attempts to escape (exit) from the vehicle after a vehicle collision has occurred, there is a possibility that the coupling member on the side door side might get in the way of escape (might impede exiting the vehicle).

SUMMARY

The present disclosure obtains an airbag device that enables a passenger to exit from a vehicle speedily after a vehicle collision has occurred, and a passenger protection device equipped with such an airbag device.

An airbag device of a first aspect includes an inflator that generates gas during a vehicle collision, and an airbag that is supplied with gas generated by the inflator, and that inflates and deploys from a seat rear side of a vehicle seat toward a seat front side via a seat upper side. In an inflated and deployed state, the airbag includes a pair of front-rear chambers extending in a seat front-rear direction via left and right sides of a head of a passenger seated in the vehicle seat, an airbag body that is in communication with the pair of front-rear chambers and that is disposed at a seat front side of the passenger between the pair of front-rear chambers, and a pair of rear tethers including one-end portions attached to the airbag body or seat front side portions of the pair of front-rear chambers, and other-end portions attached to a seatback of the vehicle seat or a vehicle body. At least a rear tether on a side door side is configured so as to be releasable after a collision of the vehicle.

In the first aspect, gas generated by an inflator during a vehicle collision is supplied into the airbag, and the airbag is inflated and deployed from the seat rear side of the vehicle seat toward the seat front side via the seat upper side. In the inflated and deployed state, the airbag includes the pair of front-rear chambers extending in the seat front-rear direction via left and right sides of the head of the passenger seated in the vehicle seat, and the airbag body that is in communication with the pair of front-rear chambers and that is disposed at the seat front side of the passenger between the pair of front-rear chambers.

The airbag includes the pair of rear tethers with the one-end portions attached to the airbag body or seat front side portions of the pair of front-rear chambers and the other-end portions attached to the seatback of the vehicle seat or the vehicle body. At least the rear tether on the side door side is configured so as to be releasable after a collision of the vehicle.

This thereby enables a passenger to escape from the vehicle at high speed after a vehicle collision by releasing the side door side rear tether. Reference here to "during a vehicle collision" encompasses when the inevitability of a collision is foreseen (predicted).

An airbag device of a second aspect is the airbag device of the first aspect, wherein a tongue is provided at the other-end portion of the rear tether, with the tongue detachably attached to a buckle device attached to the seatback of the vehicle seat or the vehicle body.

In the second aspect, the tongue is provided at the other-end portion of the rear tether by being detachably attached to the buckle device attached to the seatback of the vehicle seat or the vehicle body. The rear tether is accordingly releasable simply by pressing a release button of the buckle device. This thereby enables a passenger to escape from the vehicle at high speed after a vehicle collision due to the rear tether being released with certainty using a simple configuration.

An airbag device of a third aspect is the airbag device of the first aspect, wherein the rear tether is configured such that the other-end portion is removed from the seatback of the vehicle seat or the vehicle body by the other-end portion being pulled toward the seat front side after a tensional load toward the seat front side arising from restraint of the passenger has acted.

In the third aspect, the rear tether is configured such that the other-end portion is removed from the seatback of the vehicle seat or the vehicle body by the other-end portion being pulled toward the seat front side after a tensional load toward the seat front side arising from restraint of the passenger has acted. Namely, the rear tether is releasable by a simple operation of being pulled toward the seat front side. This thereby enables a passenger to escape from the vehicle at high speed after a vehicle collision.

An airbag device of a fourth aspect is the airbag device of the first aspect, wherein the rear tether is configured such that the other-end portion is removable from the seatback of the vehicle seat or the vehicle body after a specific period of time has elapsed from a collision of the vehicle occurring.

In the fourth aspect, the rear tether is configured such that the other-end portion is removable from the seatback of the vehicle seat or the vehicle body after the specific period of time has elapsed from a collision of the vehicle occurring. Namely, the rear tether is releasable without the need for a particular operation. This thereby enables a passenger to escape from the vehicle at high speed after a vehicle collision. Note that reference here to "after a specific period of time has elapsed" means after a time when the movement amount of the passenger toward the seat front side was a maximum.

An airbag device of a fifth aspect is an airbag device of the fourth aspect, wherein the other-end portion of the rear tether is configured so as to be released by actuation of a squib or a micro gas generator.

In the fifth aspect, the other-end portion of the rear tether is released by actuation of the squib or micro gas generator. Namely, the rear tether is releasable speedily using a simple mechanism. This thereby enables a passenger to escape from the vehicle at high speed after a vehicle collision.

A passenger protection device of a sixth aspect includes a vehicle seat for a passenger to sit on, and the airbag device of any one of the first to the fifth aspects installed at a location on a seat rear side of the vehicle seat.

In the sixth aspect, the airbag device is installed at the location on the seat rear side of the vehicle seat for the passenger to sit on. This airbag device is the airbag device of any one of the first to the fifth aspects, and so similar operation and effects to those of the first to the fifth aspects are obtained.

A passenger protection device of a seventh aspect includes an inflator that generates gas during a vehicle collision, an airbag that is supplied with gas generated by the inflator, and that inflates and deploys from a seat rear side of a vehicle seat toward a seat front side via a seat upper side, and a three-point seatbelt device provided at the vehicle seat to restrain a passenger. In an inflated and deployed state, the airbag includes a pair of front-rear chambers extending in a seat front-rear direction via left and right sides of a head of a passenger seated in the vehicle seat, an airbag body that is in communication with the pair of front-rear chambers and that is disposed at a seat front side of the passenger between the pair of front-rear chambers, and a rear tether including a one-end portion attached to the airbag body or a seat front side portion of the pair of front-rear chambers, and an other-end portion attached to a seatback of the vehicle seat or a vehicle body. The rear tether is only provided on a non-shoulder belt side of the seatbelt device.

In the seventh aspect, the gas generated by the inflator during a vehicle collision is supplied into the airbag, and the airbag is inflated and deployed from the seat rear side of the vehicle seat toward the seat front side via the seat upper side. In the inflated and deployed state the airbag includes the pair of front-rear chambers extending in the seat front-rear direction via the left and right sides of the head of the passenger seated in the vehicle seat, and the airbag body that is in communication with the pair of front-rear chambers and that is disposed at a seat front side of the passenger between the pair of front-rear chambers.

This airbag includes the rear tether having the one-end portion attached to the airbag body or the seat front side portion of the pair of front-rear chambers and the other-end portion attached to the seatback of the vehicle seat or the vehicle body, with the rear tether only being provided on the non-shoulder belt side of the seatbelt device. Namely, the rear tether is not provided on the side door side that is the shoulder belt side of the seatbelt device. This thereby enables a passenger to escape from the vehicle at high speed after a vehicle collision.

Thus as described above, the present disclosure enables a passenger to escape from the vehicle at high speed after a vehicle collision.

BRIEF DESCRIPTION OF THE DRAWINGS

Exemplary embodiments of the present disclosure will be described in detail based on the following figures, wherein:

FIG. 7 is a schematic side view illustrating an airbag of an airbag device according to the first exemplary embodiment in a state when being disposed at a front side of the passenger while being inflated and deployed;

DETAILED DESCRIPTION

Figure 1:
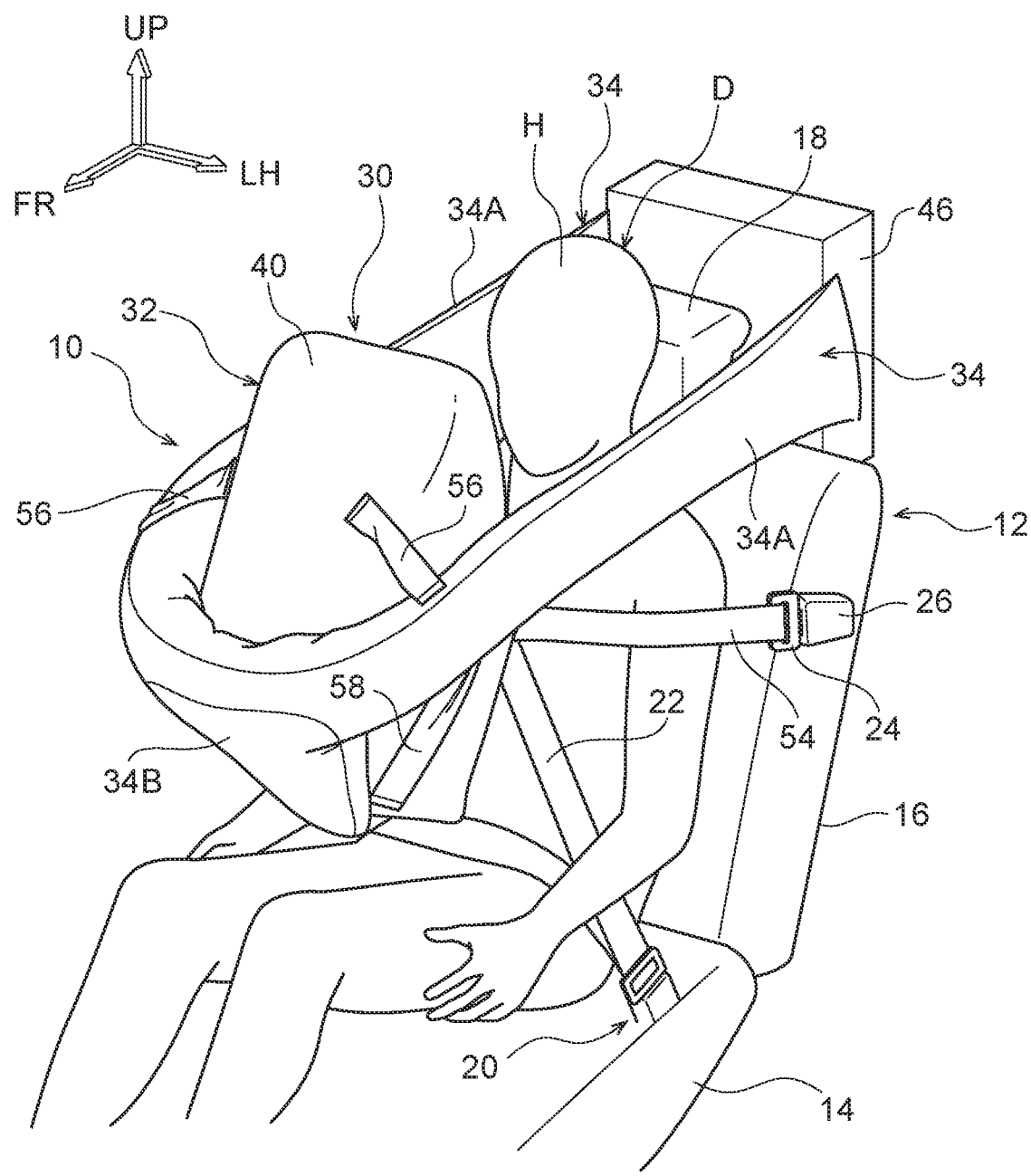
FIG. 1 is a schematic perspective view illustrating an airbag of an airbag device of a passenger protection device according to a first exemplary embodiment in an inflated and deployed state.

Detailed explanation follows regarding exemplary embodiments according to the present disclosure, with reference to the drawings. Note that for ease of explanation, in the drawings an arrow UP indicates an upward direction of a vehicle and a vehicle seat, an arrow FR indicates a forward direction of a vehicle and a vehicle seat, an arrow RH indicates a right direction of a vehicle and a vehicle seat, and an arrow LH indicates a left direction of a vehicle and a vehicle seat. Thus in the following description, unless stated otherwise, reference to up and down, front and rear, and left and right directions indicate up and down, front and rear, and left and right directions of a vehicle and a vehicle seat. Moreover, a left-right direction has the same definition as a vehicle width direction and a seat width direction.

First Exemplary Embodiment

First description follows regarding a first exemplary embodiment. As illustrated in FIG. 1, a passenger protection device 10 according to the first exemplary embodiment is configured including a vehicle seat 12 and an airbag device 30. The vehicle seat 12 is a front seat or a rear seat of a vehicle (automobile). In this example the vehicle seat 12 is a rear seat and not a front seat 13 (see FIG. 5 to FIG. 7). The vehicle seat 12 includes a seat cushion 14, a seatback 16 rotatably provided at a rear edge of the seat cushion 14, and a headrest 18 provided at an upper edge of the seatback 16 so as to be capable of being raised and lowered.

Note that in FIG. 1 etc., a state is illustrated in which a crash test dummy (person dummy) D is seated on the seat cushion 14 of the vehicle seat 12, as a model of a passenger (seated person) to be protected. The dummy D is, for example, an America male adult 50 percentile (AM50) head-on collision test dummy (Hybrid III). The dummy D is seated in a standard seated posture as determined by the crash test method, and the vehicle seat 12 is positioned at a standard set position corresponding to the seated posture. For ease of explanation, the person dummy D will be hereafter be called "passenger D".

Figure 2:
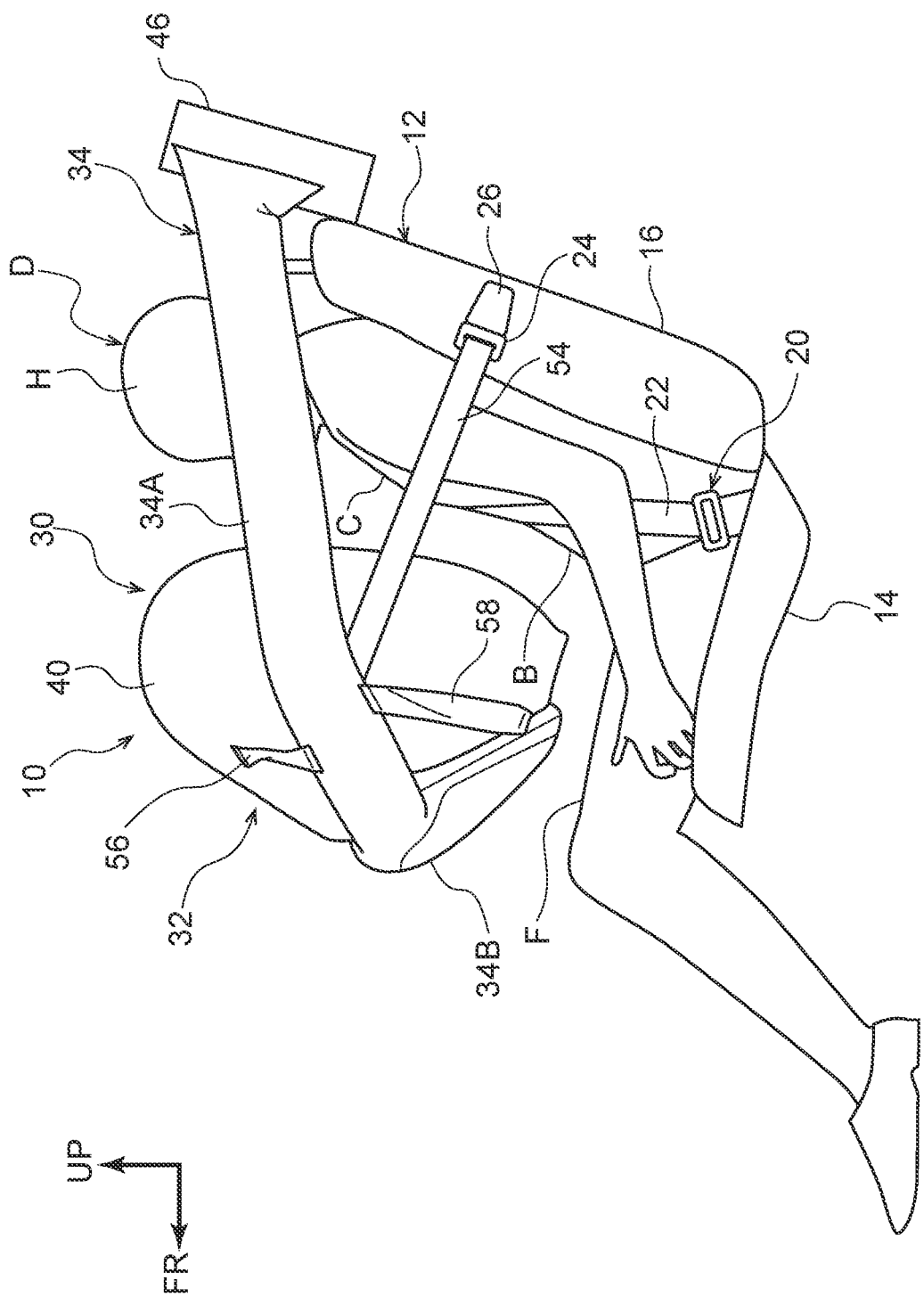
FIG. 2 is a schematic side view illustrating an airbag of an airbag device according to the first exemplary embodiment in an inflated and deployed state with respect to a passenger.

As illustrated in FIG. 1 and FIG. 2, the passenger D seated on the seat cushion 14 of the vehicle seat 12 is configured so as to be restrained in the vehicle seat 12 by a seatbelt 22 provided at a seatbelt device 20. The seatbelt device 20 is a three-point seatbelt device, and is a so-called seat-attached seatbelt device in which a non-illustrated retractor and anchor, and a buckle, are each provided at the vehicle seat 12.

The airbag device 30 includes an airbag 32, a pair of inflators 44 (see FIG. 3), and a module case 46). The airbag 32 is normally housed in a folded-up state inside the module case 46 together with the pair of inflators 44. The module case 46 is formed in a hollow cuboidal shape. The module case 46 is disposed at a rear upper portion of the vehicle seat 12 (more specifically at a rear side of the headrest 18 at an upper side of the seatback 16), and is fixed to an upper edge of the seatback 16 or to a non-illustrated vehicle body.

The airbag 32 is configured so as to be supplied with gas from the pair of the inflators 44 and inflated and deployed (deployed and inflated) from the rear side to the front side of the vehicle seat 12 via at an upper side thereof. The airbag 32 includes a front-rear chamber 34 and an airbag body 40. The front-rear chamber 34 includes a left-right pair of front-rear extension portions 34A that extend along the front-rear direction via left and right sides of a head H of the passenger D, and a coupling portion 34B that connects front end portions of the pair of front-rear extension portions 34A together in a left-right direction. The airbag body 40 inflates and deploys at a rear side of the coupling portion 34B toward the passenger D side (rear side) delayed with respect to the front-rear chamber 34, so as to be disposed between the pair of front-rear extension portions 34A and at a front side of the passenger D.

Figure 3:
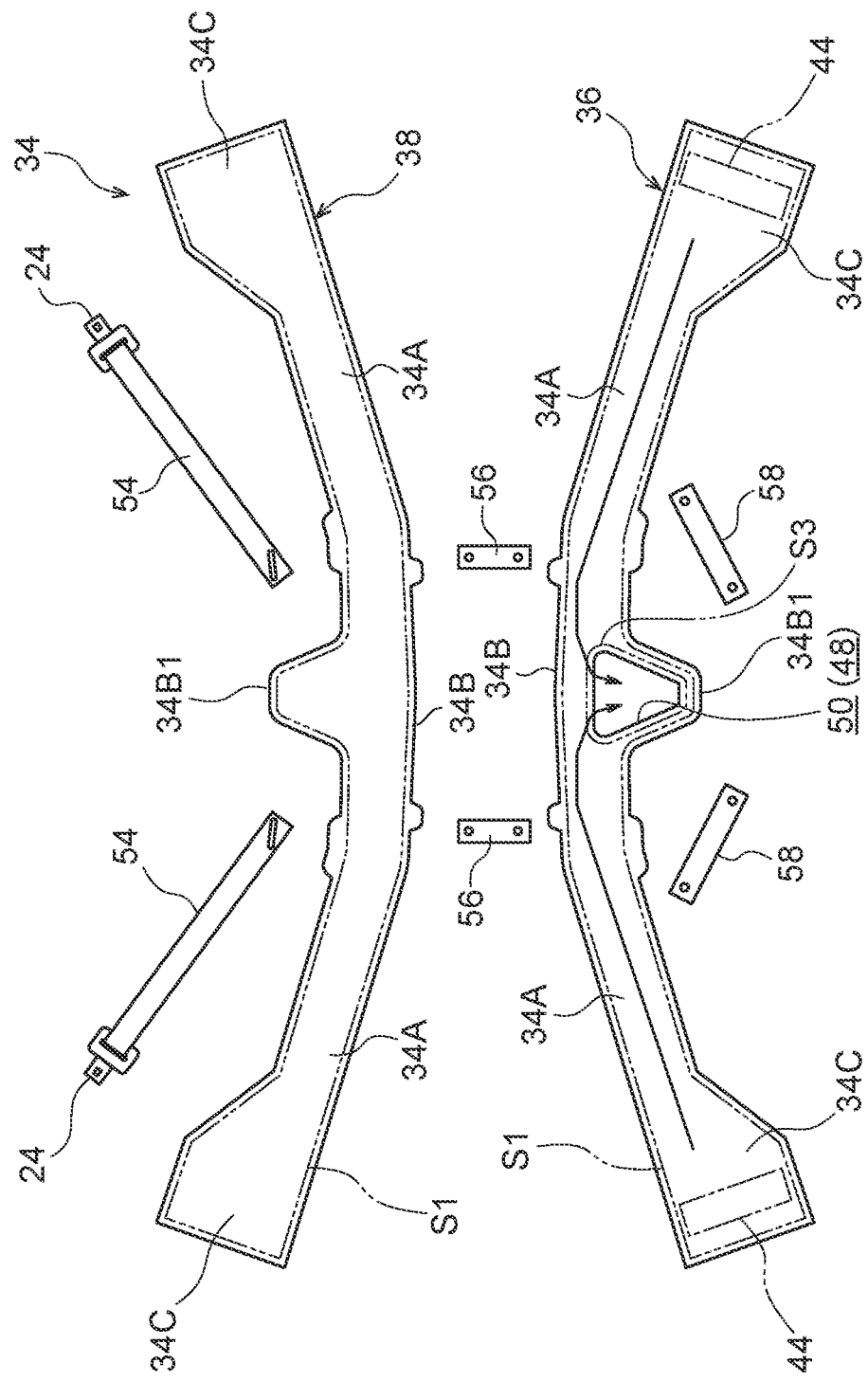
FIG. 3 is an opened out diagram of a front-rear chamber configuring an airbag of an airbag device according to the first exemplary embodiment.
Figure 4:
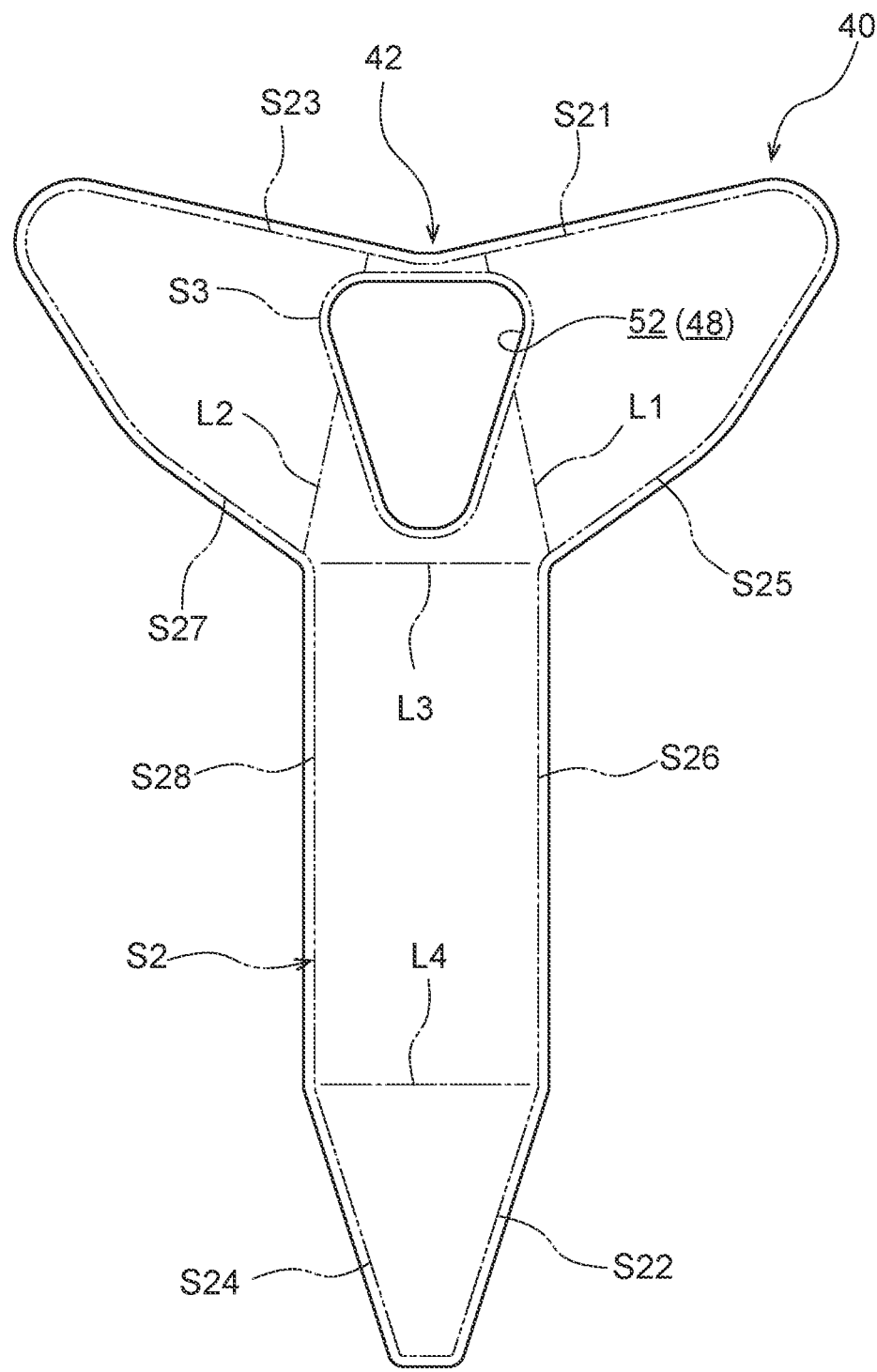
FIG. 4 is an opened out diagram of an airbag body configuring an airbag of an airbag device according to the first exemplary embodiment.

As illustrated in FIG. 3, the front-rear chamber 34 is formed in an elongated bag shape by overlapping two long base cloth 36, 38 and sewing peripheral edges thereof together along a sewn portion S1. Moreover, as illustrated in FIG. 4, the airbag body 40 is formed in a bag shape by folding a single base cloth 42 along four fold lines L1, L2, L3, L4 and sewing along a sewn portion S2.

At the sewn portion S2, a sewing line S21 is sewn to a sewing line S22, a sewing line S23 is sewn to a sewing line S24, a sewing line S25 is sewn to a sewing line S26, and a sewing line S27 is sewn to a sewing line S28. Note that the base cloths 36, 38, 42 are, for example, configured by a polyamide- or polyester-based fabric. One or both of the two base cloths 36, 38 configuring the front-rear chamber 34 is a base cloth that is less extensible than the base cloth 42 configuring the airbag body 40.

As illustrated in FIG. 3, the length direction two end portions (rear end portions of the pair of front-rear extension portions 34A) of the front-rear chamber 34 configure a pair of inflator housing portions 34C housing the left-right pair of inflators 44. Namely, a length direction central portion of the front-rear chamber 34 (a portion connecting the front end portions of the pair of front-rear extension portions 34A together in the left-right direction) is configured by the coupling portion 34B, with the respective front-rear extension portions 34A disposed between the coupling portion 34B and the pair of inflator housing portions 34C.

Although omitted in the drawings, the airbag device 30 includes a control device (ECU) for controlling actuation of the pair of inflators 44. The control device is electrically connected to the pair of inflators 44 and to a non-illustrated crash sensor (including a camera or the like), and is configured so as to be able to detect a head-on collision of the vehicle, or foresee that a head-on collision is inevitable (hereafter referred to as "predict"). The control device is configured so as to actuate the pair of inflators 44 when a head-on collision of the vehicle is detected or predicted based on information from the crash sensor.

The pair of inflators 44 are, for example, combustion type or cold-gas type cylinder inflators, configured so as to generate gas on actuation by the control device during a vehicle head-on collision. Note that the form of vehicle head-on collision for which the control device actuates the inflators 44 includes, in addition to a full frontal head-on collision, an offset head-on collision, such as an oblique collision or a small overlap collision or the like.

The pair of inflator housing portions 34C housing the pair of inflators 44 are disposed separated from each other at the left and right sides inside the module case 46. Each of the inflators 44 housed inside the respective inflator housing portions 34C is disposed with an axial direction orientated along the height direction of the seatback 16. An upper and lower pair of stud bolts (omitted in the drawings) are, for example, provided at each of the inflators 44.

The pair of stud bolts are inserted through the inflator housing portions 34C, the module case 46, and through a non-illustrated frame of the seatback 16, and nuts (omitted in the drawings) are screwed onto the respective stud bolts. The inflator housing portions 34C, the inflators 44, and the module case 46 are thereby fixed to the frame of the seatback 16.

The pair of front-rear extension portions 34A are each formed in an elongated tube shape. An enlarged portion 34B1 is integrally formed to a left-right direction central portion of the coupling portion 34B, with the enlarged portion 34B1 projecting further downward than the left-right direction two end portions of the coupling portion 34B connected to the pair of front-rear extension portions 34A. Namely, the coupling portion 34B is formed as a substantially T-shaped bag in communication with the front-rear extension portions 34A. A configuration is adopted in which a communication hole 48 is provided at a rear side of the left-right direction central portion of the coupling portion 34B including the enlarged portion 34B1.

Namely, a sewn portion S3 is formed by sewing around a periphery of a through hole 50 formed in the base cloth 36 of the front-rear chamber 34 and around a periphery of a through hole 52 (see FIG. 4) formed in the base cloth 42 of the airbag body 40, with the communication hole 48 formed so as to communicate between the through hole 50 and the through hole 52. Note that the through hole 50 and the through hole 52 are, as an example, formed in substantially inverted trapezoidal shapes. This means that the sewn portion S3 is, as an example, also formed in a substantially inverted trapezoidal shape, such that the communication hole 48 communicating the inside of the coupling portion 34B with the inside of the airbag body 40 is positioned at the inside of the sewn portion S3.

The pair of front-rear extension portions 34A, the coupling portion 34B, and the airbag body 40 are normally housed folded up inside the module case 46 with a specific folding pattern, such as roll folding, concertina folding, or the like. A non-illustrated tear line is formed to the module case 46. The tear line is configured so as to rupture on receipt of inflation pressure of the airbag 32 when the airbag 32 is being inflated and deployed. This means that the airbag 32 is able to be inflated and deployed toward the outside of the module case 46 in a sequence of the pair of front-rear extension portions 34A, then the coupling portion 34B, and then the airbag body 40.

As illustrated in FIG. 1 and FIG. 2, the inflated and deployed pair of front-rear extension portions 34A extend in the front-rear direction at the left and right sides of the head H of the passenger D, so as to oppose the head H from the left and right sides thereof, separated from the head H by respective gaps. The front end portions of the inflated and deployed pair of front-rear extension portions 34A are in a state connected together in the left-right direction by the inflated and deployed coupling portion 34B. This means that the front-rear chamber 34 including the pair of front-rear extension portions 34A and the coupling portion 34B is configured in a substantially U-shape open toward the rear in plan view (see FIG. 13).

The airbag body 40 is configured so as to be supplied with gas through the communication hole 48 and inflated and deployed toward the rear side (the passenger D side). Namely, the airbag body 40 is configured so as to be inflated and deployed at the rear side of the coupling portion 34B, toward the passenger D side (rear side) and delayed with respect to the front-rear chamber 34. The airbag body 40 is thereby configured so as to be able to pass through from the rear side toward the front side via a gap between the head H of the passenger D and a ceiling 28 of a vehicle cabin (see FIG. 5) during inflation and deployment of the front-rear chamber 34.

The inflated and deployed airbag body 40 is configured so as to face toward the head H, the chest C, and the belly B of the passenger D, separated by a gap therefrom in the front-rear direction (see FIG. 2). Note that the airbag body 40 is set with a shape such that when inflated and deployed, the airbag body 40 is sandwiched between the thighs F and the chest C of the passenger D from an intermediate-stage to a later-stage during passenger restraint.

Moreover, as illustrated in FIG. 1 and FIG. 2, a left and right pair of rear tethers 54, a left and right pair of front-upper tethers 56, and a left-right pair of front-lower tethers 58 are attached to the airbag 32. The rear tethers 54, the front-upper tethers 56, and the front-lower tethers 58 are, for example, configured in elongated belt shapes from a polyamide- or polyester-based fabric. The fabric configuring the rear tethers 54, the front-upper tethers 56, and the front-lower tethers 58 is configured so as to be less extensible than the base cloths 36, 38 configuring the front-rear chamber 34 and the base cloth 42 configuring the airbag body 40. The extensibility is adjusted by the substance, thickness, and the like of the fabric.

The pair of front-upper tethers 56 are configured so as to couple wall faces at the left and right sides of a front side of an upper portion of the airbag body 40 inflated and deployed further upward than the front-rear chamber 34, to respective front portions of the pair of front-rear extension portions 34A. Namely, respective one-end portions of the pair of front-upper tethers 56 are sewn to wall faces of the left and right sides of the front side of the upper portion of the airbag body 40 inflated and deployed further upward than the front-rear chamber 34. Each of the other-end portions of the pair of front-upper tethers 56 is sewn to the front portions of the pair of respective front-rear extension portions 34A.

The pair of front-lower tethers 58 are configured so as to couple wall faces at the left and right sides of a front side of a lower portion of the airbag body 40 inflated and deployed further downward than the front-rear chamber 34, to respective front portions of the pair of front-rear extension portions 34A. Namely, each of the one-end portions of the pair of front-lower tethers 58 is sewn to the respective wall faces at the left and right sides of the lower portion of the airbag body 40 inflated and deployed further downward than the front-rear chamber 34. Each of the other-end portions of the pair of front-lower tethers 58 is sewn to the front portions of the pair of respective front-rear extension portions 34A.

Moreover, each of one-end portions of the pair of rear tethers 54 is attached to the airbag body 40 by being sewed to the respective wall faces on the left and right sides at a front side of a lower portion of the airbag body 40 inflated and deployed further downward than the front-rear chamber 34. Each of the other-end portions of the pair of rear tethers 54 is attached to respective side portions of the seatback 16 (or to a non-illustrated vehicle body at a rear side of the passenger D). Thus in an inflated and deployed state of the airbag 32, the pair of rear tethers 54 extend obliquely rearward and downward at a lower side of the pair of front-rear extension portions 34A.

Namely, the pair of rear tethers 54 adopt an inclined orientation facing obliquely rearward and downward in side view. This results in a configuration in which, during restraint of the passenger D by the airbag 32, the airbag body 40 is pulled (drawn) relatively rearward and downward by the pair of rear tethers 54, and the airbag body 40 and front portions of the pair of front-rear extension portions 34A are pulled relatively rearward and downward about a center of rotation of the module case 46.

Moreover, from out of each of the other-end portions of the pair of rear tethers 54, at least a rear tether 54 on a non-illustrated side door side is configured so as to be releasable after a vehicle collision. Namely, this rear tether 54 is configured detachably attached to a side portion of the seatback 16 (or to a non-illustrated vehicle body at a rear side of the passenger D).

More specifically, a tongue 24 (see FIG. 3) is attached to the other-end portion of the rear tethers 54. A buckle device 26 to which the tongue 24 is detachably attached is fixed to a side portion of the seatback 16 (or to a non-illustrated vehicle body at a rear side of the passenger D). Adopting such a configuration means that the other-end portion of the rear tethers 54 is simply removed (released) by pressing a release button (omitted in the drawings) of the buckle device 26.

Next, description follows regarding operation and effects of the airbag device 30 and the passenger protection device 10 according to the first exemplary embodiment configured as described above.

The pair of inflators 44 are actuated under control from the control device when a vehicle head-on collision is detected (or predicted) by the crash sensor. Namely, gas is ejected from each of the inflators 44 into the pair of inflator housing portions 34C. The gas generated inside the pair of inflator housing portions 34C flows to the coupling portion 34B side via the pair of front-rear extension portions 34A, and is supplied into the airbag body 40 via the communication hole 48.

Figure 5:
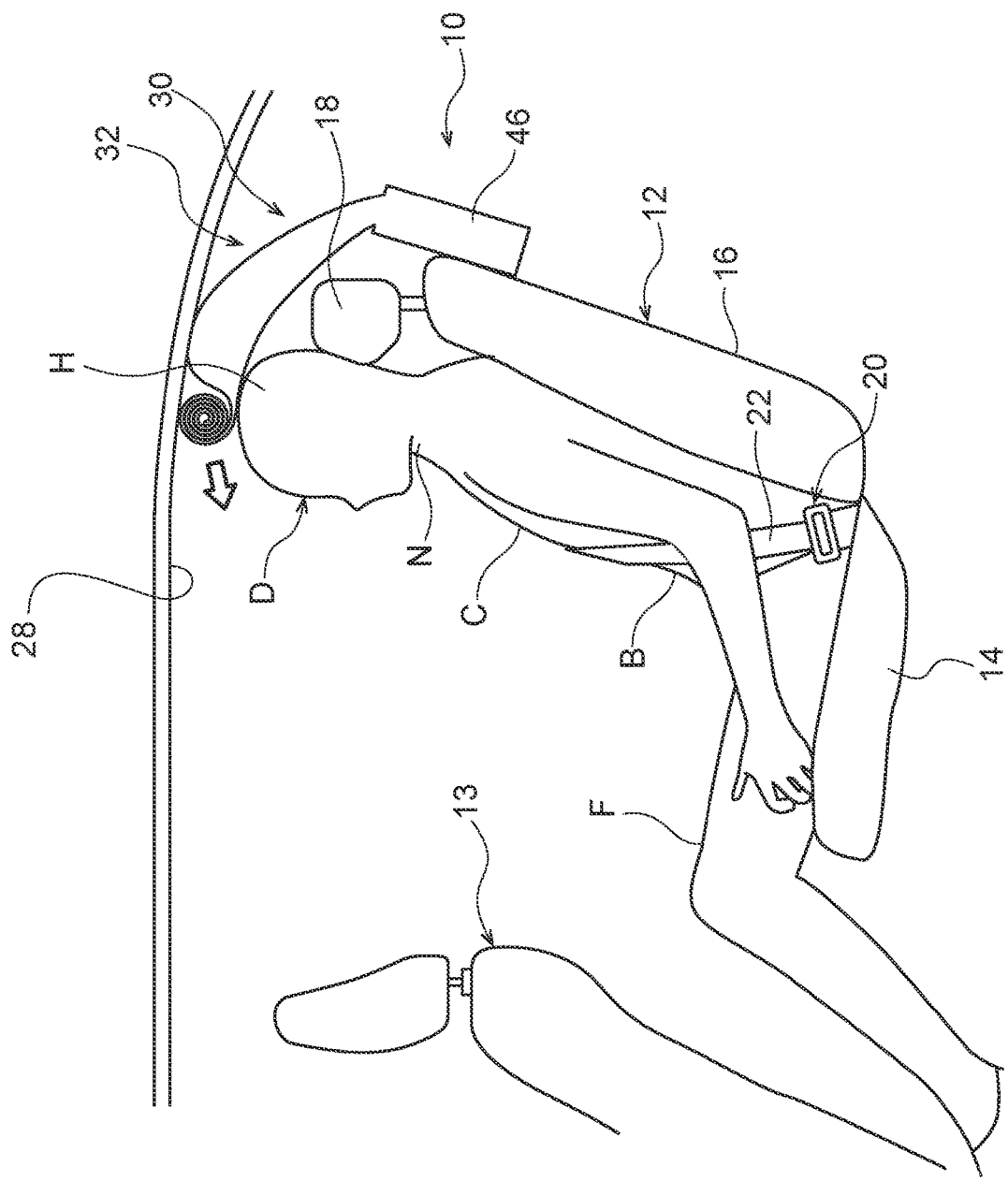
FIG. 5 is a schematic side view illustrating an airbag of an airbag device according to the first exemplary embodiment in a state when passing through a gap between the head of a passenger and a ceiling of a vehicle cabin while being inflated and deployed.

More specifically first, as illustrated in FIG. 5, the tear line of the module case 46 ruptures under receipt of inflation pressure of the airbag 32, and the airbag 32 inflates and deploys from the rear side of the vehicle seat 12 toward the front side via an upper side thereof (as indicated by the arrow). Namely, the airbag 32 deploys from a rear upper portion of the seatback 16 toward the front side via an upper side of the headrest 18 and an upper side of the head H of the passenger D.

Figure 6:
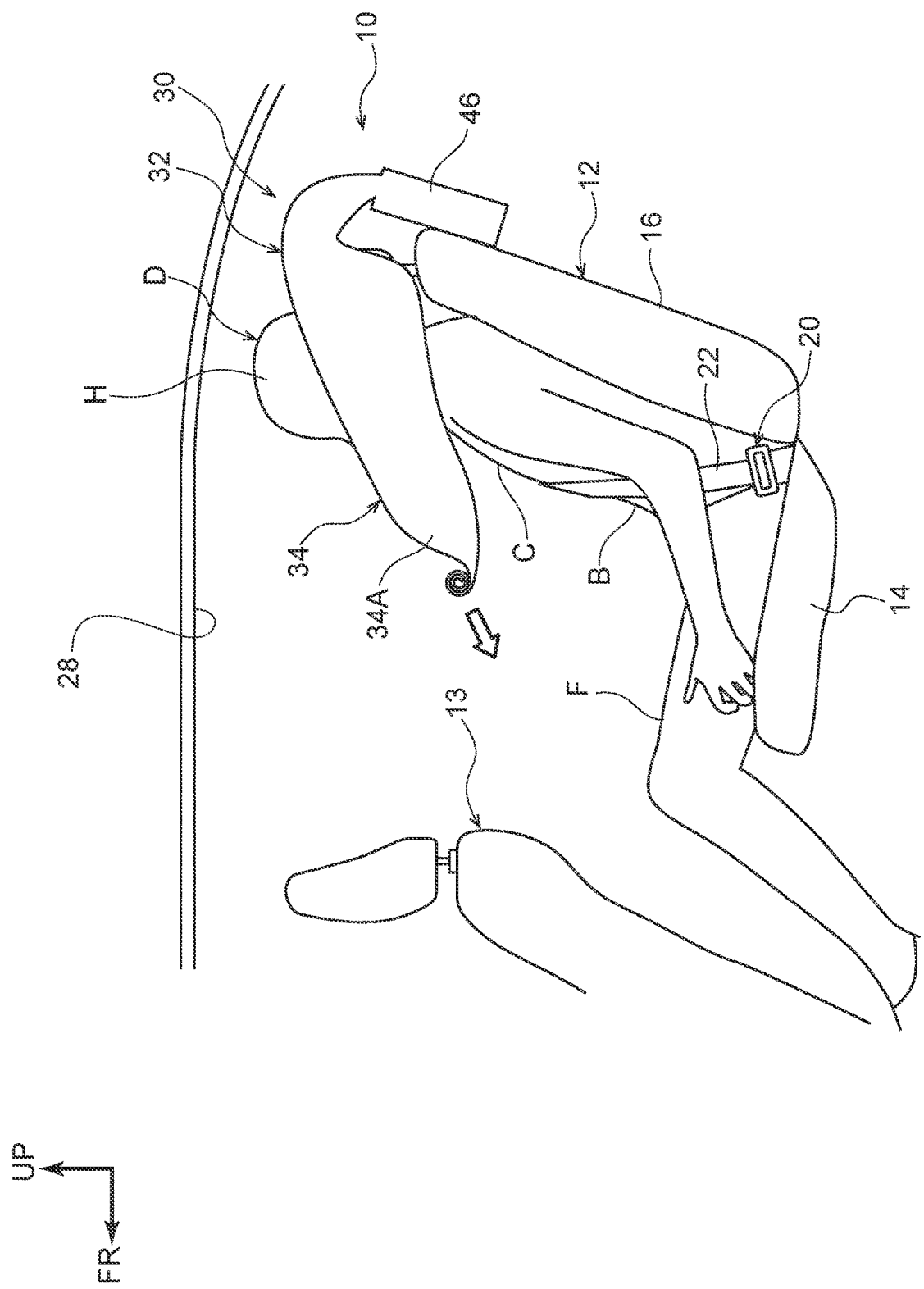
FIG. 6 is a schematic side view illustrating an airbag of an airbag device according to the first exemplary embodiment in a state when passing the shoulders of a passenger while being inflated and deployed.

Next, as illustrated in FIG. 6, the head H of the passenger D is inserted relatively into a space surrounded by the front-rear extension portions 34A of the pair of front-rear chambers 34 and by the airbag body 40 (see FIG. 7). Namely, the front-rear extension portions 34A of the pair of front-rear chambers 34 are deployed toward the front side (as indicated by the arrow) while being disposed at the left and right sides of the head H of the passenger D.

Then, as illustrated in FIG. 7, the airbag body 40 is inflated and deployed toward the passenger D side (rear side as indicated by the arrow therein) by being supplied with gas through the coupling portion 34B connecting the front end portions of the front-rear extension portions 34A of the pair of front-rear chambers 34 together in the left-right direction. Namely, as illustrated in FIG. 2, the airbag body 40 is disposed between the pair of front-rear chambers 34 and at the front side of the passenger D.

Note that during inflation and deployment of the airbag body 40, the pair of front-upper tethers 56 respectively couple left-right side locations at the front side of an upper portion of the airbag body 40 to the front portions of the pair of front-rear extension portions 34A. The pair of front-upper tethers 56 enable unintended upward displacement (rotation) of the airbag body 40 with respect to the front-rear chamber 34 about the coupling portion 34B to be suppressed when the airbag body 40 (the airbag 32) has been completely inflated and deployed.

Moreover, during inflation and deployment of the airbag body 40, the pair of front-lower tethers 58 couple locations at the left-right side of a front side of the lower portion of the airbag body 40 to the front portions of the pair of front-rear extension portions 34A. The pair of front-lower tethers 58 are able to suppress unintended downward displacement (rotation) of the airbag body 40 with respect to the front-rear chamber 34 about the coupling portion 34B when the airbag body 40 (the airbag 32) has been completely inflated and deployed.

Moreover, the pair of rear tethers 54 also extend obliquely rearward and downward at a lower side of the pair of front-rear extension portions 34A when the airbag 32 has been completely inflated and deployed. Namely, the pair of rear tethers 54 limit the airbag body 40 from moving obliquely forward and upward. This accordingly enables the airbag 32 to be suppressed from swinging in the height direction and in the front-rear direction (contributes to the stability of the deployment behavior of the airbag body 40).

Figure 8A:
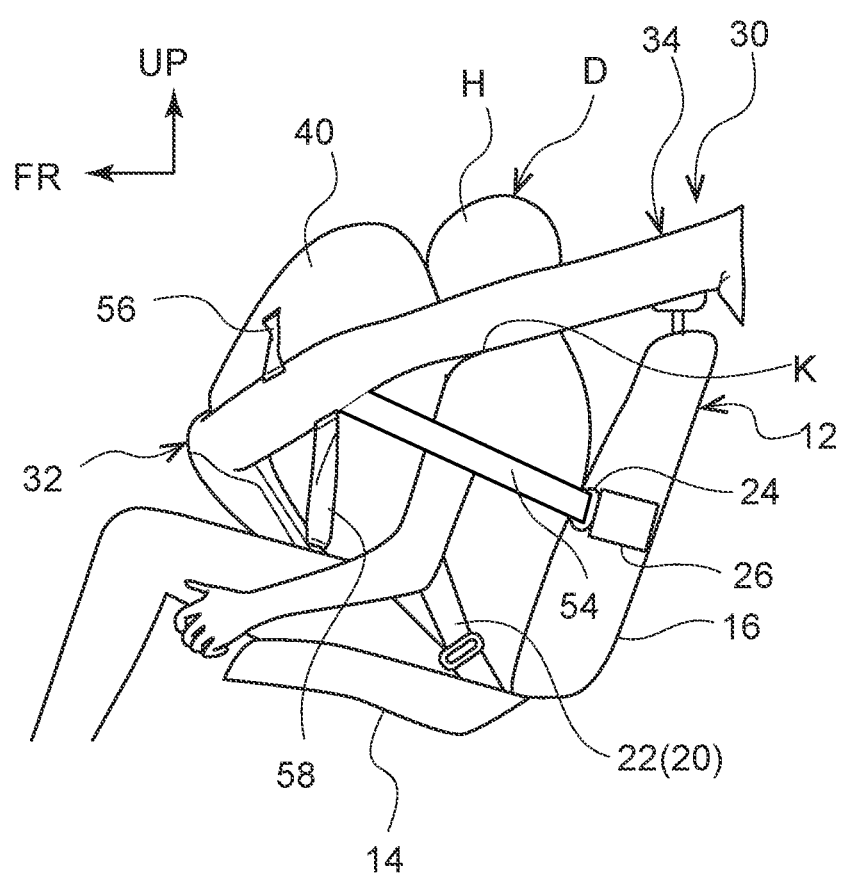
FIG. 8A is a schematic side view illustrating an airbag of an airbag device according to the first exemplary embodiment at an initial-stage of passenger restraint.
Figure 8B:
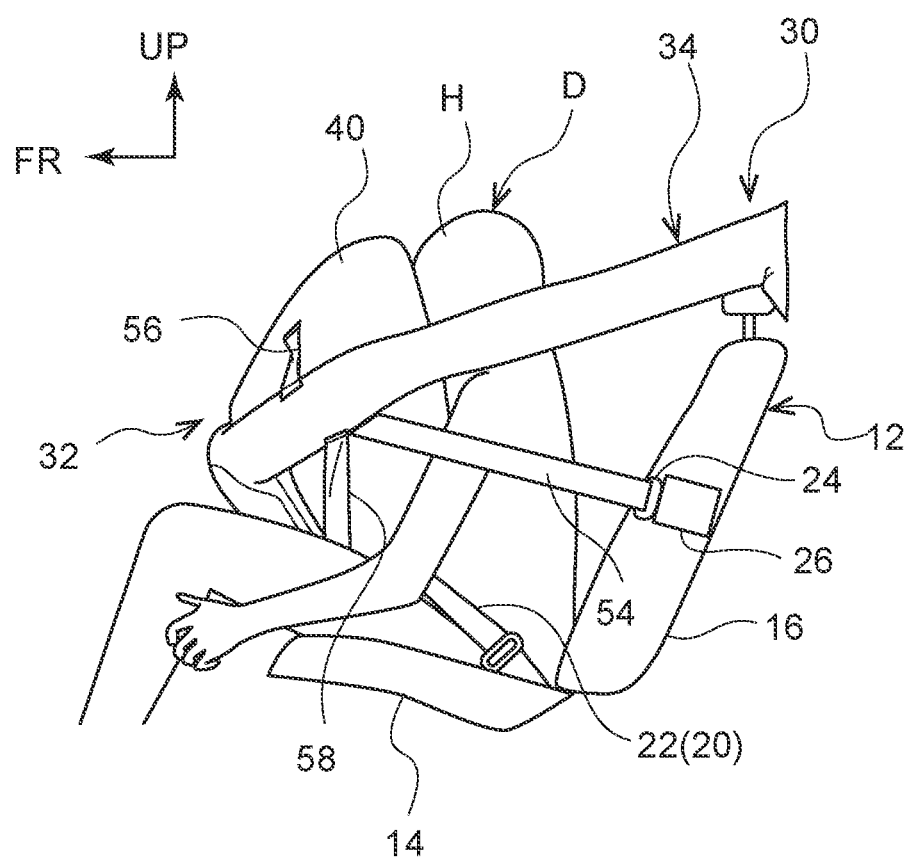
FIG. 8B is a schematic side view illustrating an airbag of an airbag device according to the first exemplary embodiment at a later-stage of passenger restraint.

In this state, as illustrated in FIG. 8A, the passenger D who has moved toward the front side under inertia from the impact of the vehicle head-on collision is restrained by the airbag body 40. More specifically, as illustrated in FIG. 8B, during restraint of the passenger D, the front-rear chambers 34 (the front-rear extension portions 34A) are stretched toward the front side by the passenger D moving toward the front side. Then the airbag body 40 is compression deformed toward the front side by being pressed toward the front side by the passenger D.

This accordingly enables the energy absorption performance of the airbag body 40 to be improved. Namely, in cases in which both the front-rear chamber 34 and the airbag body 40 receive tensional load, the load from the airbag body 40 imparted to the passenger D increases continuously with time, however the load imparted to the passenger D can be decreased somewhat by compression deformation of the airbag body 40.

Moreover, the airbag body 40 is set with a shape so as to be sandwiched between the thighs F and the chest C of the passenger D from an intermediate-stage to a later-stage during passenger restraint by the airbag 32, and so this enables contact with the upper body of the passenger D over a wide surface area. The load from the airbag body 40 imparted to the passenger D can accordingly be reduced significantly.

The airbag body 40 is also inflated and deployed toward the passenger D side at the rear side of the coupling portion 34B after the inflation and deployment of the front-rear chamber 34, and so a gap between the airbag body 40 and the passenger D becomes small. The passenger D is thereby restrained at an early-stage by the airbag body 40, enabling the initial-stage passenger D restraint performance by the airbag body 40 to be improved.

Moreover, gas is supplied from the inflators 44 into the airbag body 40 through the communication hole 48 formed at the rear side of the left-right direction central portion of the coupling portion 34B in an inflated and deployed state of the front-rear chamber 34. Namely, gas that was ejected from the inflators 44 and flowed into the pair of front-rear extension portions 34A of the front-rear chamber 34 and the coupling portion 34B is supplied into the airbag body 40 via the communication hole 48.

This thereby enables the airbag body 40 to be inflated and deployed sufficiently delayed with respect to the front-rear chamber 34. Namely, the airbag body 40 can be easily inflated and deployed toward the rear side after passing from the rear side to the front side via the narrow gap between the head H of the passenger D and the ceiling 28 of the vehicle cabin due to the inflation and deployment of the front-rear chamber 34 (see FIG. 5 to FIG. 7). This enables the airbag body 40 to be prevented from getting stuck in the narrow gap, enabling a deployment malfunction with the airbag 32 to be suppressed or prevented from occurring.

During restraint of the passenger D, the airbag body 40 is pulled relatively obliquely rearward and downward by the rear tethers 54. Namely, the pair of rear tethers 54 are stretched in the front-rear direction together with the front-rear chamber 34 during passenger restraint by the airbag body 40, enabling load imparted from the passenger D to the airbag body 40 to be borne and supported thereby, together with by the front-rear chamber 34.

Figure 8C:
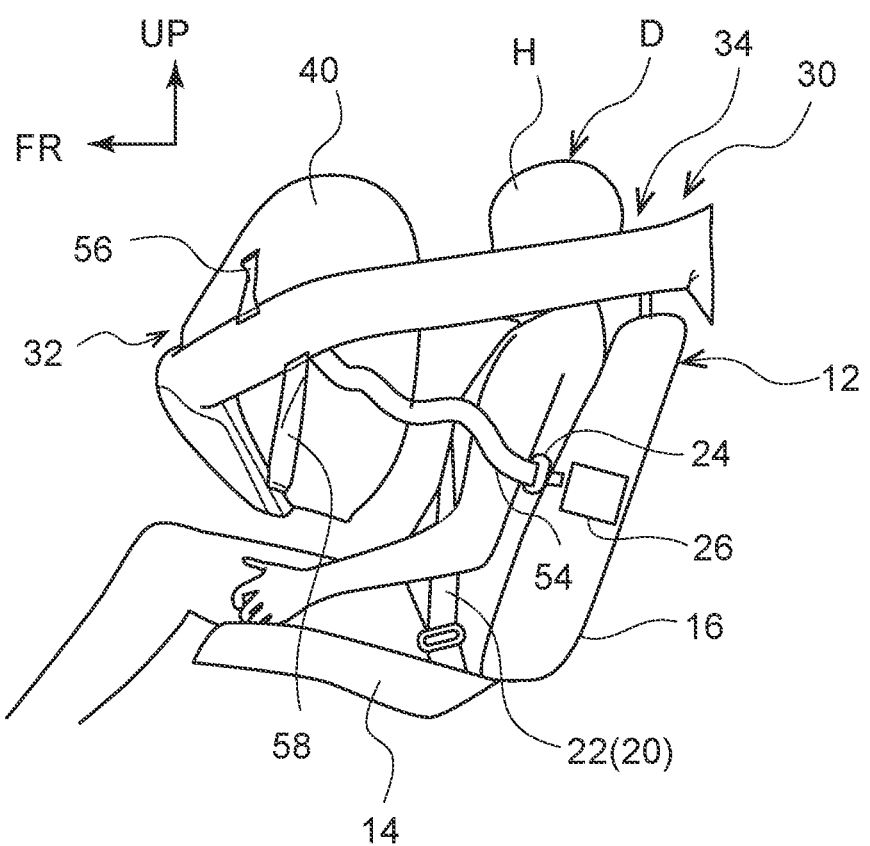
FIG. 8C is a schematic side view illustrating an airbag of an airbag device according to the first exemplary embodiment at an end of passenger restraint.

Moreover, at least the rear tether 54 on the side door side is configured so as to be releasable after a vehicle collision. Namely, the tongue 24 provided at the other-end portion of the rear tether 54 is removed (the rear tether 54 is released) simply by pressing the release button of the buckle device 26. Thus, as illustrated in FIG. 8C, the passenger D is able to escape from the vehicle at high speed (vehicle exiting performance can be improved) by releasing the rear tether 54 on the side door side after a vehicle collision.

Moreover, due to the first exemplary embodiment being configured including the tongue 24 provided at the other-end portion of the rear tether 54 and the buckle device 26 to which the tongue 24 is detachably attached, the rear tether 54 is releasable with certainty using a simple configuration. This means that after a vehicle collision the passenger D can escape from the vehicle at higher speed (vehicle exiting performance can be further improved) compared to configurations not including the tongue 24 and the buckle device 26.

Second Exemplary Embodiment

Next, description follows regarding a second exemplary embodiment. Note that the same reference numerals will be appended to locations equivalent to those of the first exemplary embodiment and detailed explanation thereof will be omitted (including of common operation and effects).

Figure 9:
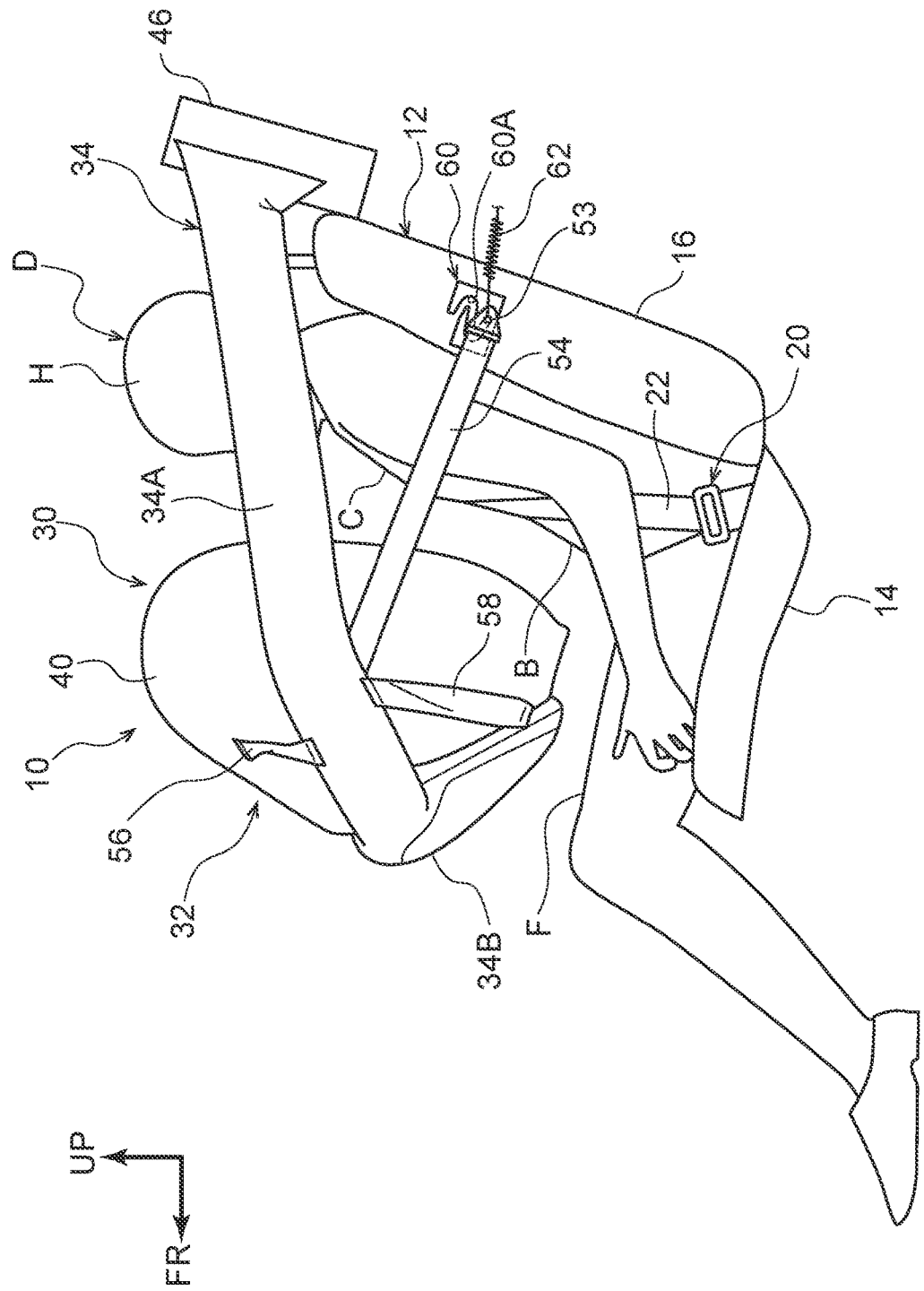
FIG. 9 is a schematic side view illustrating an airbag of an airbag device according to a second exemplary embodiment in an inflated and deployed state with respect to a passenger.

As illustrated in FIG. 9, in the second exemplary embodiment, at least the other-end portion of the rear tether 54 on the side door side is configured so as to be released from a side portion of the seatback 16 of the vehicle seat 12 (or from a non-illustrated vehicle body at a rear side of the passenger D) by pulling toward the front side after a tensional load toward the front side arising from restraint of the passenger D has acted.

More specifically, as illustrated in FIGS. 10A to 10D, guide plates 60 each formed with a guide groove 60A are respectively fixed to left and right side portions of the seatback 16. The left side guide groove 60A is formed with a substantially Z-shape in side view, and the right side guide groove 60A (omitted in the drawings) is formed with a substantially reversed Z-shape in side view (formed in a shape left-right symmetrical to the left side guide groove 60A).

A substantially circular pillar shaped projection portion 53 for engaging with and being guided by the guide groove 60A is attached to the other-end portion of the rear tether 54 so as to have its axial direction along a thickness direction of the rear tether 54. Furthermore, a one-end portion of a tension coil spring 62 serving as a biasing member is attached to a location where the projection portion 53 of the rear tether 54 attaches, and the other-end portion of the tension coil spring 62 is attached to the seatback 16 (or the vehicle body).

Figure 10A:
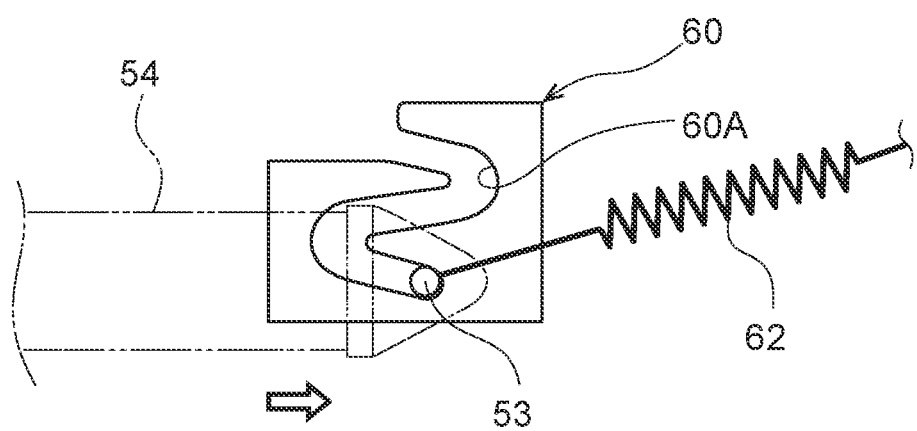
FIG. 10A is a schematic side view illustrating a process in which rear tether of an airbag of an airbag device according to the second exemplary embodiment is removed.

Due to adopting such a configuration, as illustrated in FIGS. 10A to 10D, the other-end portion of the rear tether 54 is removed from the guide plate 60 by the rear tether 54 being pulled toward the front side after a tensional load toward the front side has acted. To explain more specifically, as illustrated in FIG. 10A, the projection portion 53 is positioned at a lower end portion of the guide groove 60A prior to a vehicle collision (i.e. normally), and in this state the projection portion 53 is biased (pulled) toward an obliquely rearward and upward side by the tension coil spring 62. This means that the projection portion 53 is not removed from the guide plate 60 prior to a vehicle collision (i.e. normally).

Figure 10B:
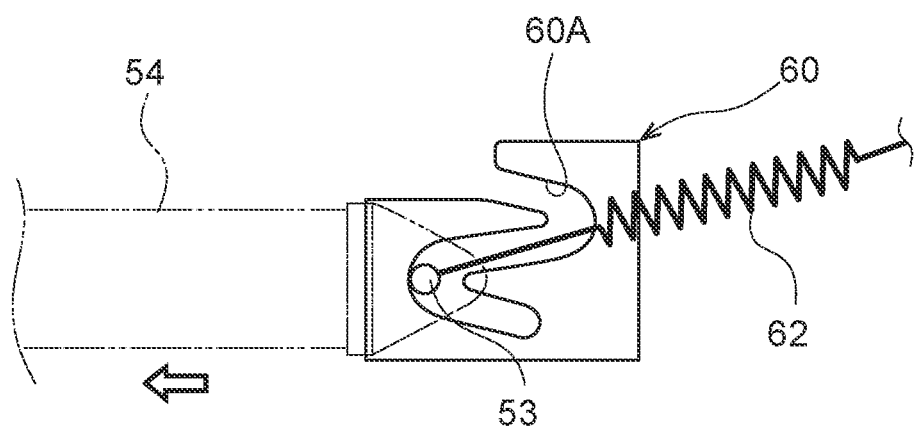
FIG. 10B is a schematic side view illustrating a process in which rear tether of an airbag of an airbag device according to the second exemplary embodiment is removed.

When the vehicle has a head-on collision, as illustrated in FIG. 10B, the rear tether 54 is pulled toward the front side against the biasing force of the tension coil spring 62 by the passenger D moving under inertia toward the front side during passenger restraint by the airbag body 40. When this occurs the projection portion 53 moves toward the front side along the guide groove 60A. The rear tether 54 is not removed from the guide plate 60 in this state, and so the airbag body 40 is pulled relatively obliquely rearward and downward by the rear tether 54, and the passenger D is more effectively restrained by the airbag body 40.

Figure 10C:
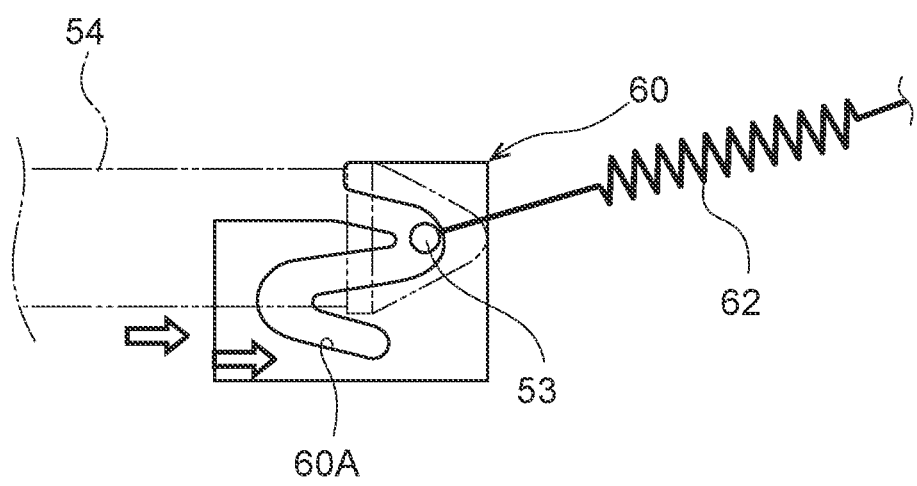
FIG. 10C is a schematic side view illustrating a process in which rear tether of an airbag of an airbag device according to the second exemplary embodiment is removed.
Figure 10D:
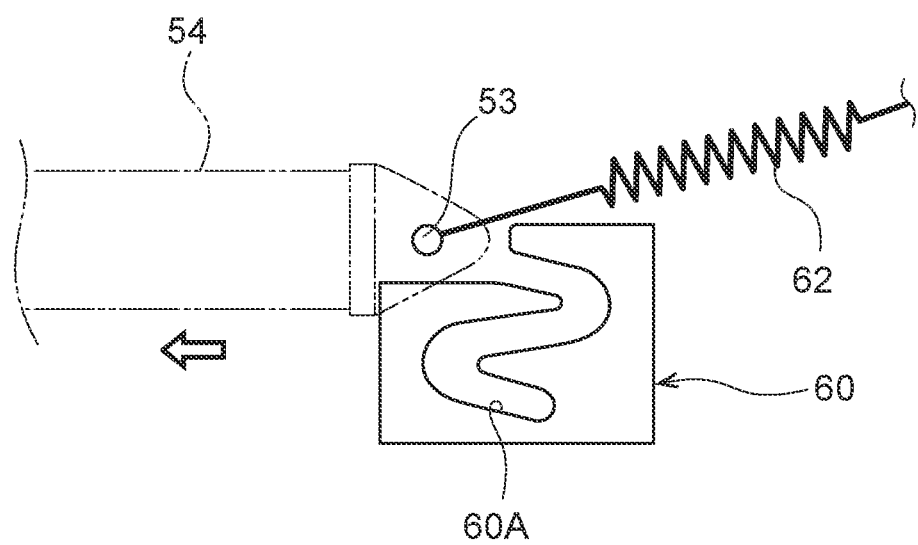
FIG. 10D is a schematic side view illustrating a process in which rear tether of an airbag of an airbag device according to the second exemplary embodiment is removed.

After the end of passenger restraint, tensional load no longer acts toward the front side with respect to the rear tether 54 and so, as illustrated in FIG. 10C, the other-end portion (the projection portion 53) of the rear tether 54 moves obliquely rearward and upward along the guide groove 60A due to biasing force of the tension coil spring 62. Then when the passenger D is exiting the vehicle, the passenger D manually pulls the rear tether 54 obliquely forward and upward. When this occurs, as illustrated in FIG. 10D, the projection portion 53 comes out from being inside the guide groove 60A.

Thus by the passenger D manually lifting up the rear tether 54 in this state, the tension coil spring 62 is also stretched, and the passenger D is able to extricate the rear tether 54 and the tension coil spring 62 from the lower side, enabling the passenger D to escape from the vehicle. Thus in this manner, in the second exemplary embodiment the rear tether 54 can be released by the simple operation of pulling the rear tether 54 toward the front side. This thereby enables the passenger D to escape from the vehicle at high speed after a vehicle collision.

Third Exemplary Embodiment

Next, description follows regarding a third exemplary embodiment. Note that the same reference numerals will be appended to locations equivalent to those of the first exemplary embodiment and the second exemplary embodiment and detailed explanation thereof will be omitted (including of common operation and effects).

In the third exemplary embodiment, the rear tethers 54 are each configured such that the other-end portion thereof is removed from a side portion of the seatback 16 (or the vehicle body) after a specific period of time has elapsed from when a vehicle collision occurred. More specifically, the other-end portion of the rear tether 54 is configured so as to be removed from the side portion of the seatback 16 (or the vehicle body) by actuation of a micro gas generator 68 as illustrated in FIG. 11 or a squib 66 as illustrated in FIG. 12.

Figure 11A:
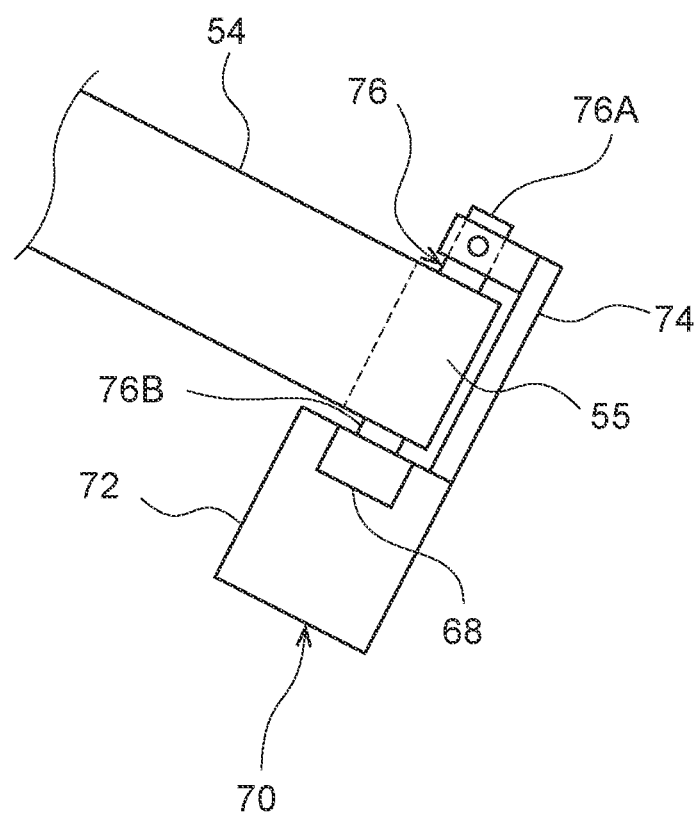
FIG. 11A is a schematic side view illustrating a state prior to removing a rear tether of an airbag of an airbag device according to a third exemplary embodiment.

As illustrated in FIG. 11A, a tubular portion 55 is integrally formed to the other-end portion of the rear tether 54 with an axial direction in a direction orthogonal to the rear tether 54 extension direction in side view. A separation device 70 is fixed to a side portion of the seatback 16. The separation device 70 includes a main body 72 with the micro gas generator 68 in-built into an upper face side thereof, a support portion 74 having a substantially inverted L-shape in side view and extending toward the upper side from a rear end portion of the upper face of the main body 72, and a circular pillar shaped pin 76.

The pin 76 is formed slightly longer than the length of the support portion 74, and a base portion (upper end portion) 76A of the pin 76 is supported by an upper front end of the support portion 74 so as to be rotatable with an axial direction of the vehicle width direction. The pin 76 is inserted inside the tubular portion 55 of the rear tether 54, and a leading end portion (lower end portion) 76B of the pin 76 is detachably attached to the upper face of the main body 72.

Figure 11B:
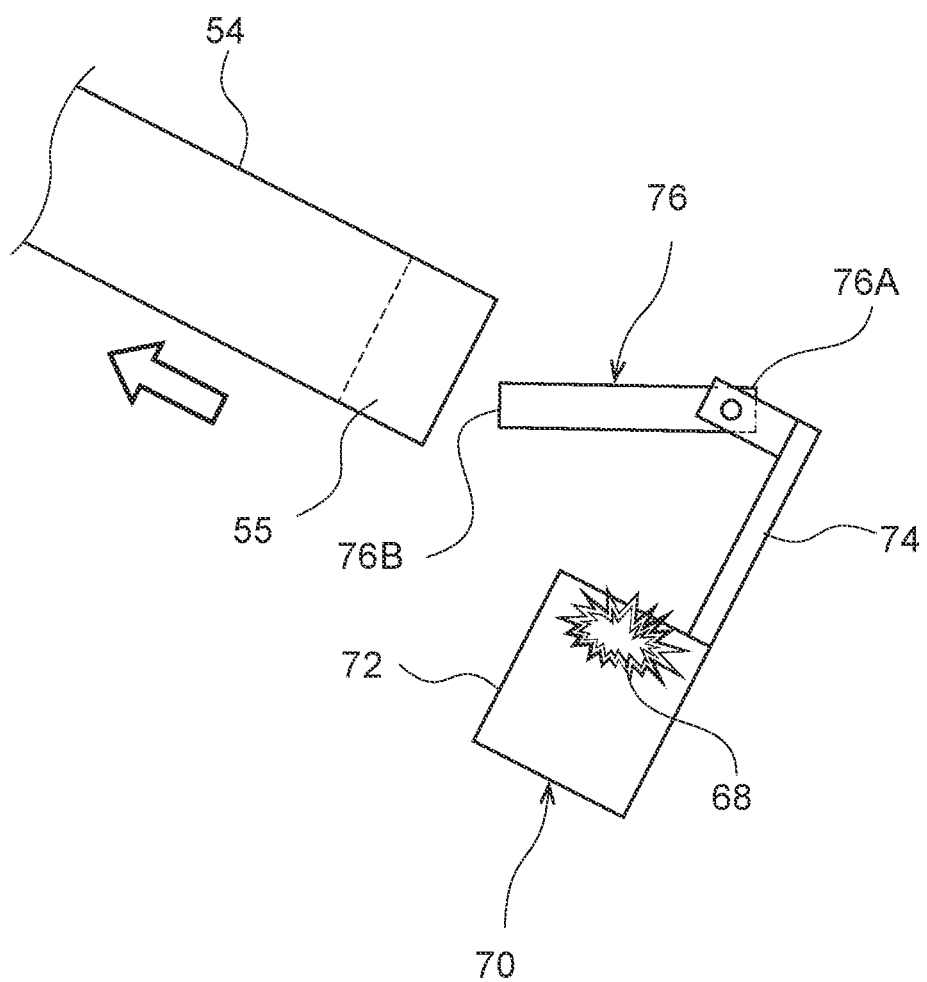
FIG. 11B is a schematic side view illustrating a state after removing a rear tether of an airbag of an airbag device according to the third exemplary embodiment.

Namely, as illustrated in FIG. 11B, when the micro gas generator 68 is actuated, the attached state of the leading end portion 76B of the pin 76 to the upper face of the main body 72 is released, in a configuration such that the leading end portion 76B of the pin 76 is pressed out toward the front side by pressure of gas. When the rear tether 54 is pulled toward the front side in this state, the leading end portion 76B of the pin 76 rotates toward the front side about the base portion 76A, such that the pin 76 is removed from the tubular portion 55. Namely, the other-end portion of the rear tether 54 becomes removable from the side portion of the seatback 16.

Figure 12A:
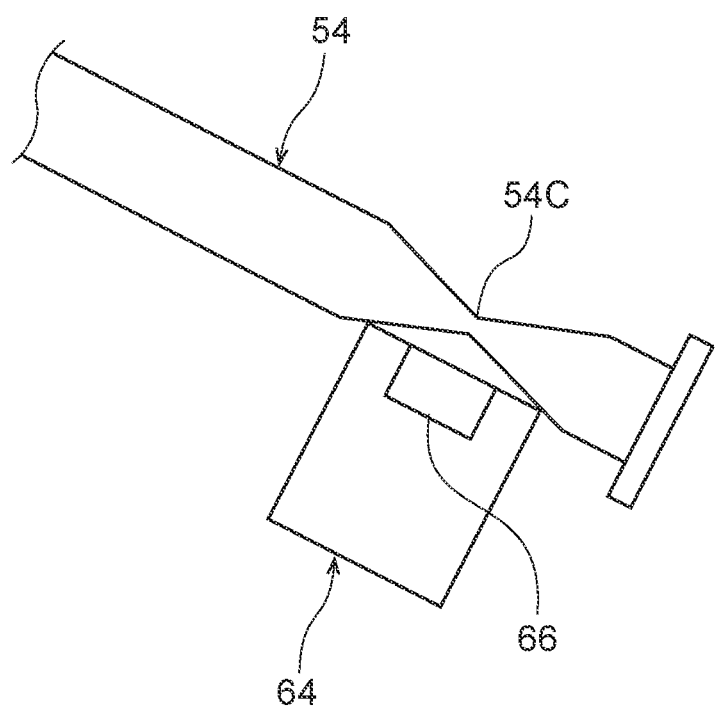
FIG. 12A is a schematic side view illustrating a state prior to removing a rear tether of an airbag of an airbag device according to a third exemplary embodiment.
Figure 12B:
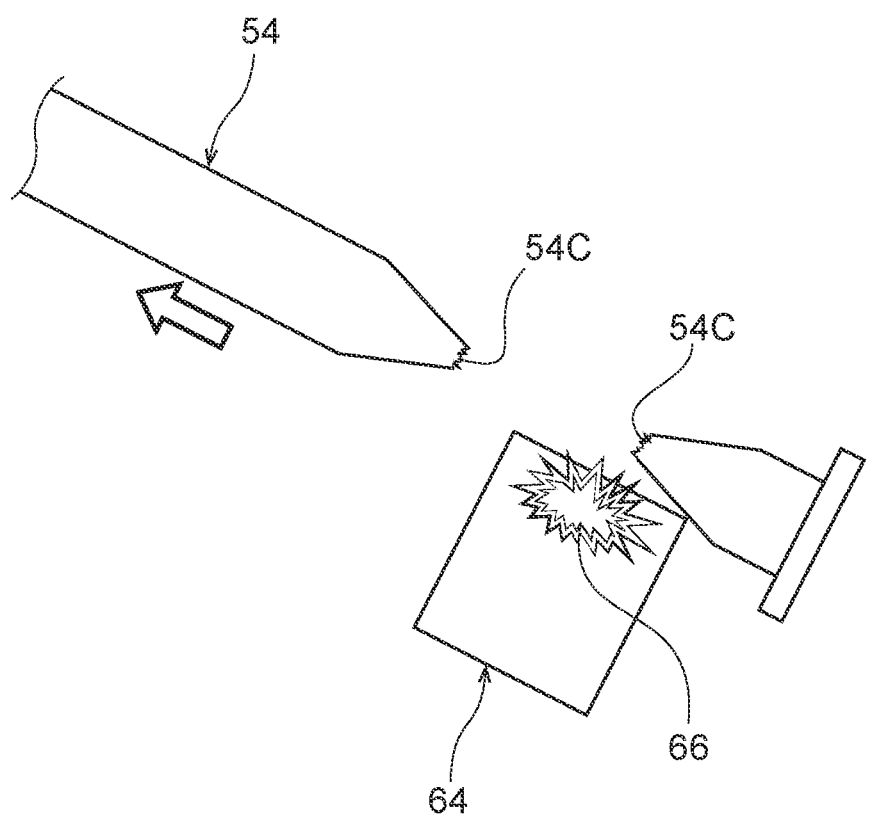
FIG. 12B is a schematic side view illustrating a state after removing a rear tether of an airbag of an airbag device according to the third exemplary embodiment.

Moreover, as illustrated in FIG. 12A, a separation device 64 equipped with the squib 66 may be fixed to a side portion of the seatback 16. The separation device 64 has the squib 66 in-built into the upper face side thereof, and the other-end portion of the rear tether 54 is fixed to the side portion of the seatback 16. A portion 54C of the rear tether 54 that faces the squib 66 in the up-down direction and is in close proximity thereto is formed with a width narrower than other locations thereon. Thus, as illustrated in FIG. 12B, the portion 54C of the rear tether 54 is burned through by actuation of the squib 66. Namely, the other-end portion of the rear tether 54 becomes removable from the side portion of the seatback 16.

Thus in this manner, in the third exemplary embodiment, the other-end portion of the rear tether 54 is automatically removed from the side portion of the seatback 16 (the rear tether 54 is released) after the specific period of time has elapsed from the vehicle collision occurring, without there being need for the passenger D to perform a particular operation. This thereby enables the passenger D to escape from the vehicle at high speed after a vehicle collision. Note that reference here to "after the specific period of time has elapsed" means after a time when the movement amount of the passenger D toward the front side was a maximum.

Moreover, in the third exemplary embodiment, the other-end portion of the rear tether 54 is removed by actuation of the micro gas generator 68 or the squib 66. Namely, the other-end portion of the rear tether 54 is speedily removed from the side portion of the seatback 16 (the rear tether 54 is speedily released) using a simple mechanism. This thereby enables the passenger D to escape from the vehicle at high speed after a vehicle collision.

Fourth Exemplary Embodiment

Finally, description follows regarding a fourth exemplary embodiment. Note that the same reference numerals will be appended to locations equivalent to those of the first exemplary embodiment to the third exemplary embodiment and detailed explanation thereof will be omitted (including of common operation and effects).

Figure 13:
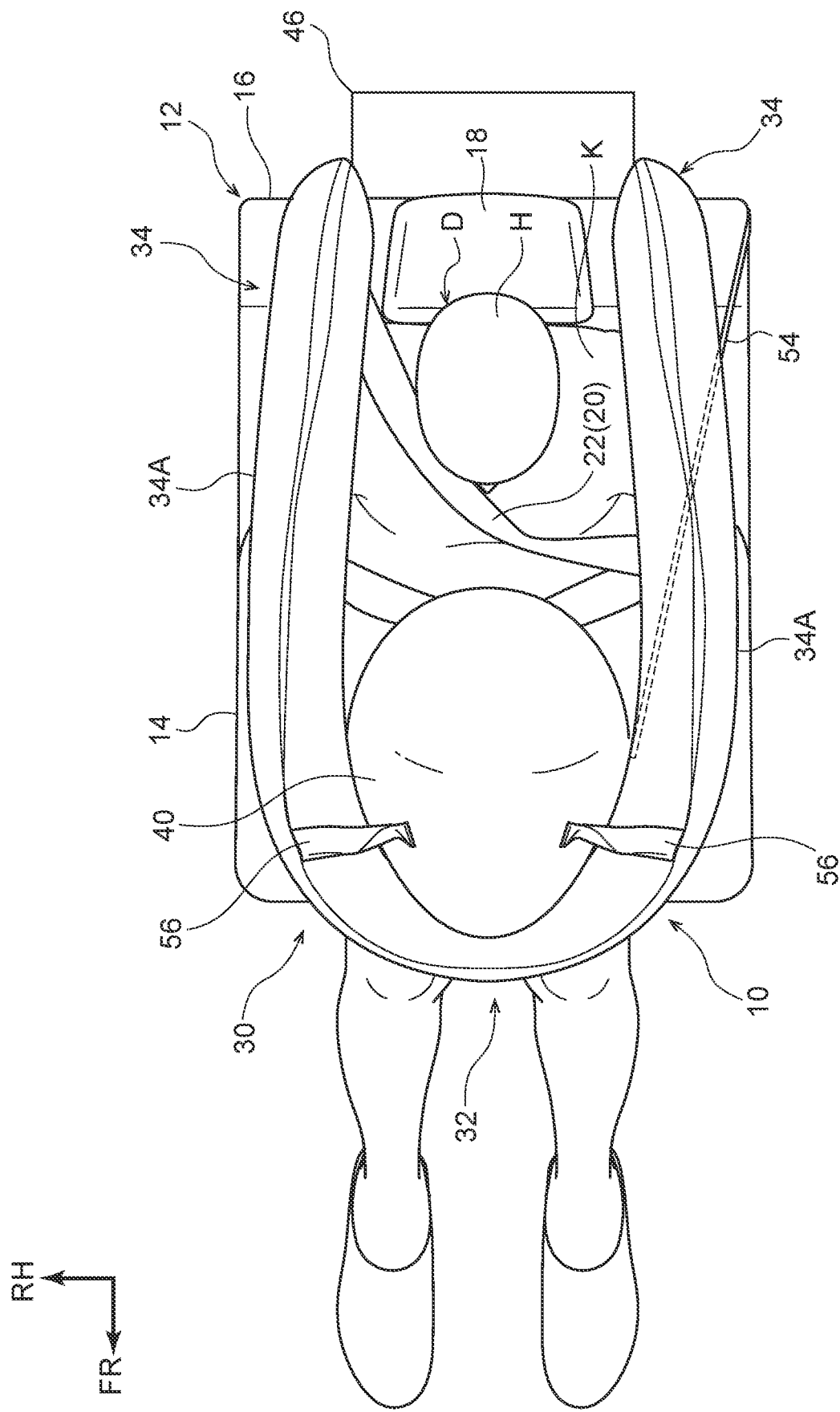
FIG. 13 is a schematic side view illustrating an airbag of an airbag device according to a fourth exemplary embodiment in an inflated and deployed state with respect to a passenger.

As illustrated in FIG. 13, in the fourth exemplary embodiment, the rear tether 54 is provided only on a non-shoulder belt side of the seatbelt device 20 (the side of the shoulder K not wearing the seatbelt 22). Namely, this rear tether 54 is not provided on shoulder belt side of the seatbelt device 20 (the side of the shoulder K wearing the seatbelt 22). Normally the shoulder belt side of the seatbelt device 20 is on a side door side. Thus due to there being no rear tether 54 present on the side door side, which is the escape side after a vehicle collision, there is no inconvenience of the rear tether 54 getting in the way, enabling the passenger D to escape from the vehicle at high speed.

Moreover, due to the rear tether 54 not being provided on the shoulder belt side of the seatbelt device 20, a situation in which the shoulder belt (seatbelt 22) and the rear tether 54 become snagged (entangled) with each other does not occur. Note that the passenger D seated in the vehicle seat 12 is restrained by the shoulder belt at the shoulder K on the vehicle width direction outside and the chest C, and so a restraining force is already acting on the vehicle width direction outside shoulder K. This means that even when the rear tether 54 on the vehicle width direction outside (side door side) is dispensed with, passenger restraint performance can still be secured during a vehicle head-on collision.

Although the airbag device 30 and the passenger protection device 10 according to the present exemplary embodiment have been described with reference to the drawings, the airbag device 30 and the passenger protection device 10 according to the present exemplary embodiment are not limited to those illustrated in the drawings, and appropriate design changes may be made within a range not departing from the spirit of the present disclosure.

For example, instead of each of the one-end portions of the pair of rear tethers 54 being attached to the airbag body 40 at the respective wall faces on the left and right sides at a front side of a lower portion of the airbag body 40 inflated and deployed further downward than the front-rear chamber 34, each of the one-end portions may be attached by being sewn to a length direction intermediate portion of the pair of front-rear extension portions 34A, and more specifically to each front portion (front side portion) of the inflated and deployed front-rear extension portions 34A.

What is claimed is:

1. An airbag device comprising:
   an inflator that generates gas during a vehicle collision; and an airbag that is supplied with the gas generated by the inflator, and that inflates and deploys from a seat rear side of a vehicle seat toward a seat front side via a seat upper side, wherein, in an inflated and deployed state, the airbag includes:

a front-rear chamber that includes a pair of front-rear chambers extending in a seat front-rear direction via left and right sides of a head of a passenger seated in the vehicle seat and a coupling portion that connects front end portions of the pair of front-rear chambers;

an airbag body that is in communication with the pair of front-rear chambers and the coupling portion, and that the airbag body is disposed at a seat front side of the passenger between the pair of front-rear chambers and at a rear side of the coupling portion; and a pair of rear tethers including one-end portions attached to the airbag body or seat front side portions of the pair of front-rear chambers, and other-end portions attached to a seatback of the vehicle seat or a vehicle body, and wherein at least a rear tether, of the pair of rear tethers, on a side door side is configured so as to be releasable after a collision of the vehicle.

2. The airbag device of claim 1, wherein a tongue is provided at the other-end portion of the at least the rear tether on the side door side, with the tongue detachably attached to a buckle device attached to the seatback of the vehicle seat or the vehicle body.

3. The airbag device of claim 1, wherein the at least the rear tether on the side door side is configured such that the other-end portion is removed from the seatback of the vehicle seat or the vehicle body by the other-end portion being pulled toward the seat front side after a tensional load toward the seat front side arising from restraint of the passenger has acted.

4. The airbag device of claim 1, wherein the at least the rear tether on the side door side is configured such that the other-end portion is removable from the seatback of the vehicle seat or the vehicle body after a specific period of time has elapsed from a collision of the vehicle occurring.

5. The airbag device of claim 4, wherein the other-end portion of the at least the rear tether on the side door side is configured so as to be released by actuation of a squib or a micro gas generator.

6. The airbag device of claim 4, wherein after the specific period of time has elapsed is a time after a movement amount of the passenger toward the seat front side is a maximum movement amount of the passenger toward the seat front side.

7. A passenger protection device comprising:
a vehicle seat for a passenger to sit on; and
the airbag device of claim 1 installed to a location on the seat rear side of the vehicle seat.

8. The airbag device of claim 1, wherein each of one-end portions of the pair of rear tethers is attached to respective wall faces on left and right sides at a front side of a lower portion of the airbag body inflated and deployed further downward than the front-rear chamber, and each of the other-end portions of the pair of rear tethers is attached to respective side portions of the seatback or a vehicle body.

9. The airbag device of claim 8, wherein each of the other-end portions of the pair of rear tethers is attached to the respective side portions of the vehicle body, the vehicle body is at a rear side of the passenger.

10. The airbag device of claim 8, wherein in the inflated and deployed state of the airbag, the pair of rear tethers extend obliquely rearward and downward at a lower side of the pair of front-rear chambers.

11. The airbag device of claim 8, wherein a fabric forming the pair of rear tethers is less extensible than base cloths forming the front-rear chamber and a base cloth forming the airbag body.

12. A passenger protection device comprising:
an inflator that generates gas during a vehicle collision;
an airbag that is supplied with the gas generated by the inflator, and that inflates and deploys from a seat rear side of a vehicle seat toward a seat front side via a seat upper side; and
a three-point seatbelt device provided at the vehicle seat to restrain a passenger, wherein, in an inflated and deployed state, the airbag includes:

a pair of front-rear chambers extending in a seat front-rear direction via left and right sides of a head of a passenger seated in the vehicle seat;

an airbag body that is in communication with the pair of front-rear chambers, and that the airbag body is disposed at a seat front side of the passenger between the pair of front-rear chambers; and a rear tether including a one-end portion attached to the airbag body or a seat front side portion of one of the pair of front-rear chambers, and an other-end portion attached to a seatback of the vehicle seat or a vehicle body, and wherein the rear tether is only provided on a non-shoulder belt side of the seatbelt device.

13. An airbag device comprising:
an inflator that generates gas during a vehicle collision; and
an airbag that is supplied with the gas generated by the inflator, and that inflates and deploys from a seat rear side of a vehicle seat toward a seat front side via a seat upper side, wherein, in an inflated and deployed state, the airbag includes:

a pair of front-rear chambers extending in a seat front-rear direction via left and right sides of a head of a passenger seated in the vehicle seat;

an airbag body that is in communication with the pair of front-rear chambers, and that is disposed at a seat front side of the passenger between the pair of front-rear chambers; and a pair of rear tethers including one-end portions attached to the airbag body or seat front side portions of the pair of front-rear chambers, and other-end portions attached to a seatback of the vehicle seat or a vehicle body, and wherein at least a rear tether, of the pair of rear tethers, on a side door side is configured so as to be releasable after a collision of the vehicle, wherein at least the rear tether on the side door side is configured such that the other-end portion is removable from the seatback of the vehicle seat or the vehicle body after a specific period of time has elapsed from a collision of the vehicle occurring, and wherein the other-end portion of at least the rear tether on the side door side is configured so as to be released by actuation of a squib or a micro gas generator.

* * * * *